United States Patent
Xing et al.

(10) Patent No.: US 8,369,290 B2
(45) Date of Patent: Feb. 5, 2013

(54) SYSTEM AND METHOD FOR SUPPORTING HANDOVERS BETWEEN DIFFERENT RADIO ACCESS TECHNOLOGIES OF A WIRELESS COMMUNICATIONS SYSTEM

(75) Inventors: Shuqing Xing, San Diego, CA (US); Young Hoon Kwon, San Diego, CA (US); Zhixian Xiang, San Diego, CA (US); Yali Qin, Shanghai (CN); Zhiming Li, San Diego, CA (US)

(73) Assignee: Futureweil Technologies, Inc, Plano, TX (US)

( * ) Notice: Subject to any disclaimer, the term of this patent is extended or adjusted under 35 U.S.C. 154(b) by 542 days.

(21) Appl. No.: 12/617,466

(22) Filed: Nov. 12, 2009

(65) Prior Publication Data
US 2010/0260147 A1   Oct. 14, 2010

Related U.S. Application Data

(60) Provisional application No. 61/168,847, filed on Apr. 13, 2009.

(51) Int. Cl.
*H04W 4/00* (2009.01)
*H04W 36/00* (2009.01)
*H04J 3/16* (2006.01)
*H04B 17/02* (2006.01)

(52) U.S. Cl. ......... 370/334; 370/437; 455/133; 455/436

(58) Field of Classification Search .................. 370/310, 370/328–339, 349; 455/130, 132, 133, 137, 455/140, 230, 516, 517, 526, 63.2, 150.1, 455/160.1, 178.1, 434, 422.1, 432.1, 436–445
See application file for complete search history.

(56) References Cited

U.S. PATENT DOCUMENTS

| | | | |
|---|---|---|---|
| 7,089,009 | B1 | 8/2006 | Fauconnier |
| 2002/0160785 | A1 | 10/2002 | Ovesjo et al. |
| 2004/0120283 | A1 | 6/2004 | Rezaiifar et al. |
| 2004/0189526 | A1 | 9/2004 | Frank |
| 2006/0073829 | A1 | 4/2006 | Cho et al. |
| 2007/0155344 | A1 | 7/2007 | Wiessner et al. |
| 2007/0213059 | A1 | 9/2007 | Shaheen |
| 2007/0254692 | A1 | 11/2007 | McCoy |

(Continued)

FOREIGN PATENT DOCUMENTS

| | | |
|---|---|---|
| AU | 2006349035 A1 | 4/2008 |
| CN | 1350763 A | 5/2002 |

(Continued)

OTHER PUBLICATIONS

International Search Report and the Written Opinion of the International Searching Authority, International Application No. PCT/CN2009/075116, Applicant: Huawei Technologies Co., LTD., Mar. 11, 2010, 10 pages.

(Continued)

*Primary Examiner* — Habte Mered
(74) *Attorney, Agent, or Firm* — Slater & Matsil, L.L.P.

(57) ABSTRACT

A system and method for supporting handovers between different radio access technologies is provided. A method for communications device operations includes sending a request to a controller of the communications device to change an operating mode of the communications device, and receiving a transmission responsive to the request. The method also includes in response to determining that the controller has granted the request to change the operating mode and that the communications device is operating in a border cell, changing the operating mode of the communications device, tuning at least one receiver of the communications device to an alternate radio access technology (RAT), and initiating a handover with the alternate RAT.

23 Claims, 10 Drawing Sheets

U.S. PATENT DOCUMENTS

| | | | |
|---|---|---|---|
| 2009/0017823 A1 | 1/2009 | Sachs et al. | |
| 2010/0099416 A1 | 4/2010 | Kazmi et al. | |
| 2011/0021158 A1 | 1/2011 | Xing et al. | |
| 2011/0281584 A1* | 11/2011 | Sander et al. | 455/436 |
| 2012/0063419 A1* | 3/2012 | Zhao et al. | 370/331 |

FOREIGN PATENT DOCUMENTS

| | | | |
|---|---|---|---|
| CN | 1988485 A | 6/2007 | |
| CN | 101277514 A | 10/2008 | |
| CN | 101401470 | 4/2009 | |
| CN | 101483897 A | 7/2009 | |
| EP | 1 744 580 A1 | 1/2007 | |
| EP | 1 886 521 A1 | 2/2008 | |
| WO | WO 2004/114691 A1 | 12/2004 | |
| WO | WO 2006/019269 A1 | 2/2006 | |
| WO | WO 2007/048113 A2 | 4/2007 | |
| WO | WO 2007/103496 A1 | 9/2007 | |
| WO | WO 2008/041894 A1 | 4/2008 | |

OTHER PUBLICATIONS

International Search Report and the Written Opinion of the International Searching Authority, International Application No. PCT/CN2010/075377, Applicant: Huawei Technologies Co., LTD., Nov. 4, 2010, 11 pages.

"Extended European Search Report," International Application No. PCT/CN2009075116, Applicant: Huawei Technologies Co., LTD., 10 pages.

* cited by examiner

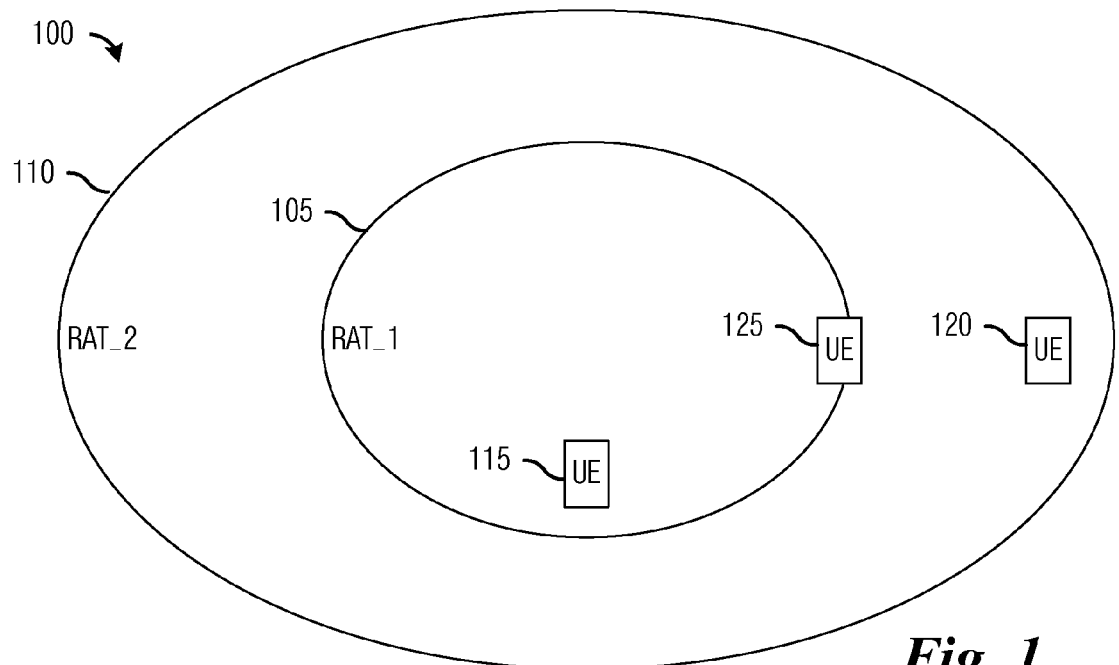
Fig. 1
*(Prior Art)*
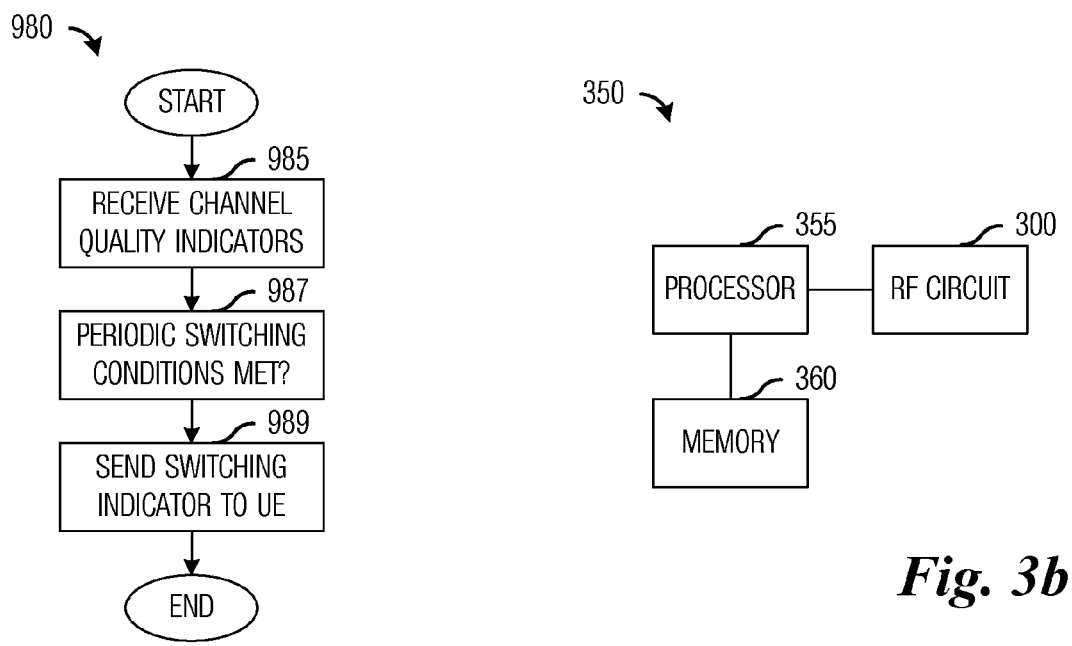
Fig. 9c
Fig. 3b

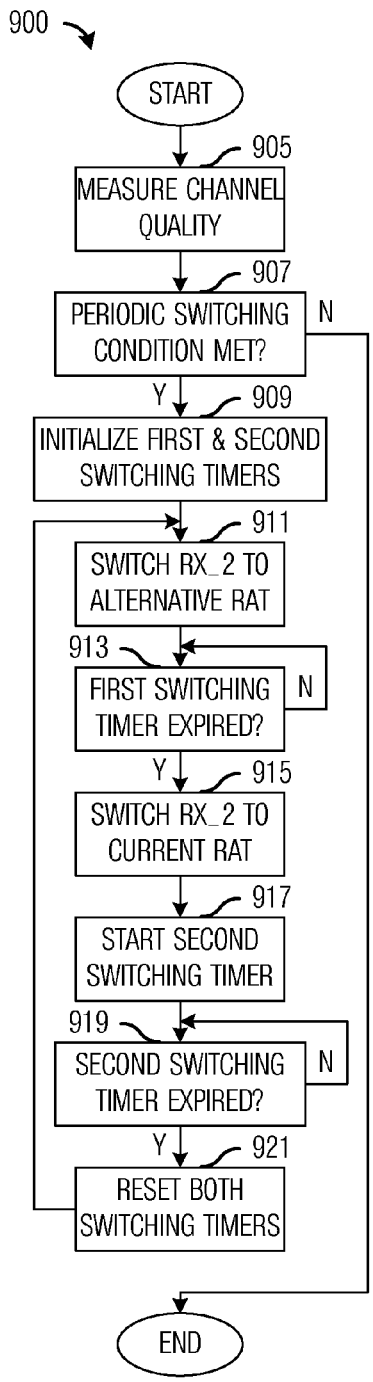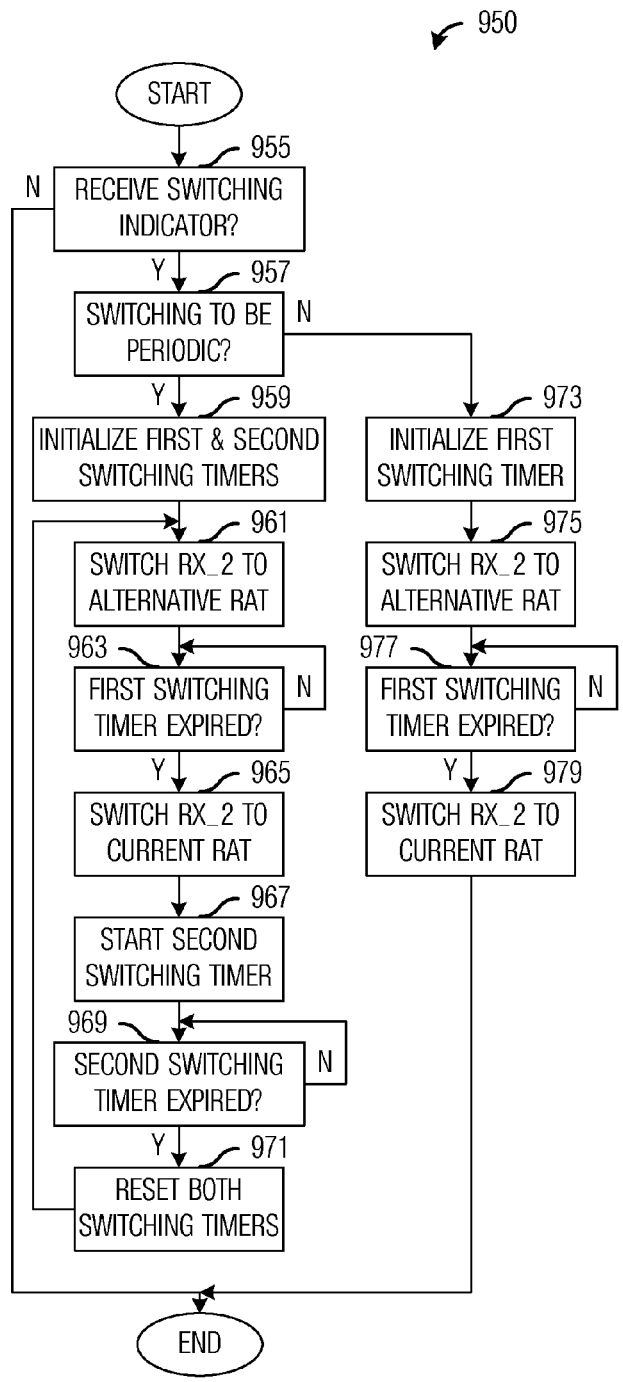
*Fig. 9a*    *Fig. 9b*

SYSTEM AND METHOD FOR SUPPORTING HANDOVERS BETWEEN DIFFERENT RADIO ACCESS TECHNOLOGIES OF A WIRELESS COMMUNICATIONS SYSTEM

This application claims the benefit of U.S. Provisional Application No. 61/168,847, filed on Apr. 13, 2009, entitled "Multiple Receivers with Different Radio Technology during Handover," which application is hereby incorporated herein by reference.

TECHNICAL FIELD

The present invention relates generally to wireless communications, and more particularly to a system and method for supporting handovers between different radio access technologies (RATs).

BACKGROUND

As wireless communications systems continue to evolve and improve, it may be common for a service area to be served by multiple wireless communications systems as service providers upgrade equipment while keeping older equipment operational for compatibility purposes as well as improved coverage. In order to maximize user equipment (UE) flexibility, UE may be operable in the multiple wireless communications systems. UEs may also be referred to as mobile stations (MS), terminals, users, communications devices, and so forth.

FIG. 1 illustrates a prior art wireless communications system 100. Wireless communications system 100 includes a first wireless communications network 105 that makes use of a first radio access technology (RAT_1) and a second wireless communications network 110 that makes use of a second radio access technology (RAT_2). RAT_2 may be an older access technology that has been in use for a longer period of time, hence second wireless communications network 110 may have a larger coverage area than first wireless communications network 105. For example, RAT_2 may be a first or second generation access technology, such as code division multiple access (CDMA), CDMA2000, high rate packet data (HRPD), and so on, while RAT_1 may be a third or fourth generation access technology, such as long term evolution (LTE), LTE-Advanced, WiMAX, and so forth.

Wireless communications system 100 also includes UEs, such as UE 115, UE 120, and UE 125. The UEs may be capable of operating in both first wireless communications network 105 and second wireless communications network 110. The UEs may also be capable of changing service from first wireless communications network 105 to second wireless communications network 110, and vice versa. This is commonly referred to as a handover.

As shown in FIG. 1, UE 115 may be operating in a center of first wireless communications network 105 (which is also in a coverage area of second wireless communications network 110), and since first wireless communications network 105 may offer higher data rates, more functionality, etc., UE 115 may prefer to be served by a controller of first wireless communications network 105. UE 120 may be operating in a coverage area of second wireless communications network 110 that is outside of a coverage area of first wireless communications network 105, so UE 120 may be served by a controller of second wireless communications network 110 by default.

A controller of a wireless communications network may control transmissions to and from a UE that it is serving. For example, the controller may receive a transmission intended for the UE and store (buffer) the transmission until it forwards the transmission to the UE. Additionally, the controller may control transmissions made by the UE by allocating network resources to the UE, without which, the UE may not be able to transmit. The controller may also be referred to as a base station (BS), base terminal station (BTS), NodeB, enhanced NodeB (eNB), and so forth.

UE 125 may be operating in a border of a cell (also referred to as a cell edge scenario) of first wireless communications network 105, wherein UE 125 may be receiving transmissions from first wireless communications network 105 at low power levels. In such a situation, UE 125 may be a candidate for a handover from first wireless communications network 105 (also referred to as a current RAT) to second wireless communications network 110 (also referred to as an alternate RAT) if it is capable of receiving better service from second wireless communications network 110.

SUMMARY OF THE INVENTION

These and other problems are generally solved or circumvented, and technical advantages are generally achieved, by embodiments of a system and method for supporting handovers between different radio access technologies.

In accordance with an embodiment, a method for communications device operations is provided. The method includes sending a request to a controller of the communications device to change an operating mode of the communications device, and receiving a transmission responsive to the request. The method also includes in response to determining that the controller has granted the request to change the operating mode and that the communications device is operating in a border cell, changing the operating mode of the communications device, tuning at least one receiver of the communications device to an alternate radio access technology (RAT), and initiating a handover with the alternate RAT.

In accordance with another embodiment, a method for controller operations is provided. The method includes receiving channel quality information from a communications device, and receiving a request for operating mode change from the communications device. The method also includes in response to determining that the channel quality information meets a first condition and that receiver switching conditions are met, granting request for operating mode change, instructing the communications device to tune at least one receiver to an alternate radio access technology (RAT), and initiating a handover of the communications device to the alternate RAT In accordance with another embodiment, a method for communications device operations is provided. The communications device has multiple fully configurable receivers. The method includes starting a first timer, and tuning at least one fully configurable receiver to an alternate radio access technology (RAT). The method also includes in response to determining that the first timer has expired, tuning the at least one fully configurable receiver back to a current RAT.

In accordance with another embodiment, a communications device is provided. The communications device includes a processor that executes applications and programs, a memory coupled to the processor, and a radio frequency (RF) circuit having multiple fully configurable receivers, the RF circuit coupled to the processor. The memory stores applications and programs. The RF circuit independently tunes a first subset of the fully configurable receivers to a first radio access technology (RAT) and a second subset of the fully configurable receivers to a second RAT.

An advantage of an embodiment is that by reducing circuitry in a RF portion of UEs, the overall cost of the UEs may be reduced.

A further advantage of an embodiment is that the reduced RF circuitry in the UEs may lead to decreased power consumption and increased batter life.

Yet another advantage of an embodiment is that inter-RAT handover performance may be improved, with shorter handover delays (which may help meet quality of service (QoS) requirements) and decreased drop connections or calls (which may help to meet customer satisfaction requirements). This may lead to better overall performance and increased user satisfaction.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 1 is a diagram of a prior art wireless communications system;

FIG. 3b is a diagram of a UE;

FIG. 9a is a flow diagram of UE operations in switching mode operation, wherein the switching mode is initiated by a UE;

FIG. 9b is a flow diagram of UE operations in switching mode operation, wherein the switching mode is initiated by an eNB; and FIG. 9c is a flow diagram of eNB operations in switching mode operation, wherein the switching mode is initiated by an eNB.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a wireless communications system with a first wireless communications network (for example, CDMA) and a second wireless communications network (for example, LTE) configured as an overlay. The second wireless communications network may be more advanced and offers higher data rate, more functionality, and so forth, but a smaller coverage area than the first wireless communications network. The invention may also be applied, however, to other wireless communications network combinations, such as CDMA-LTE-A, HRPD-LTE, HRPD-LTE-A, CDMA2000-LTE, CDMA2000-LTE-A, CDMA-WiMAX, CDMA2000-WiMAX, CDMA-UMTS, CDMA2000-UMTS, WiMAX-LTE, WiMAX-LTE-A, UMTS-LTE, UMTS-LTE-A, LTE-CDMA, LTE-UMTS/GSM, WiMAX-CDMA, and so on.

In general, there are several different types of receiver configurations for a UE. For example, with a UE with two receivers, in first receiver configuration may include two receive antennas and two RAT circuits. Each receive antenna in the first receiver configuration may be dedicated to one RAT circuit. In the first receiver configuration, no one RAT circuit can utilize both receive antennas.

In a second receiver configuration, again may be two receive antennas and two RAT circuits with both receive antennas being connected to one RAT circuit. Therefore, at any given time, only one RAT circuit may be operating.

According to the Third Generation Partnership Project (3GPP) LTE Revision Eight (Rev8) technical standard, a UE may have one transmitter and two receivers (enabling the UE to simultaneously receive two different RATs using two radio frequency (RF) chains) or one transmitter and one receiver (enabling the UE to receive one RAT at a time). However, current implementations of UEs uses a single radio only that includes two receivers to support 2×2 multiple input, multiple output (MIMO) operation. In 2×2 MIMO, both receivers operate with a single RAT.

Hence, to meet 3GPP LTE Rev8 technical standards, a UE with the first receiver configuration may need at least three receivers to enable 2×2 MIMO operation, while a UE with the second receiver configuration may need at least three receivers to enable simultaneous tuning to multiple RATs.

Furthermore, there is a desire with wireless communications system providers to use UEs with only one transmitter and as few receivers as possible (e.g., 1TX/2RX) due to reduced UE cost and reduced power consumption (increased battery life) associated with reduced RF circuitry.

Figure 2:
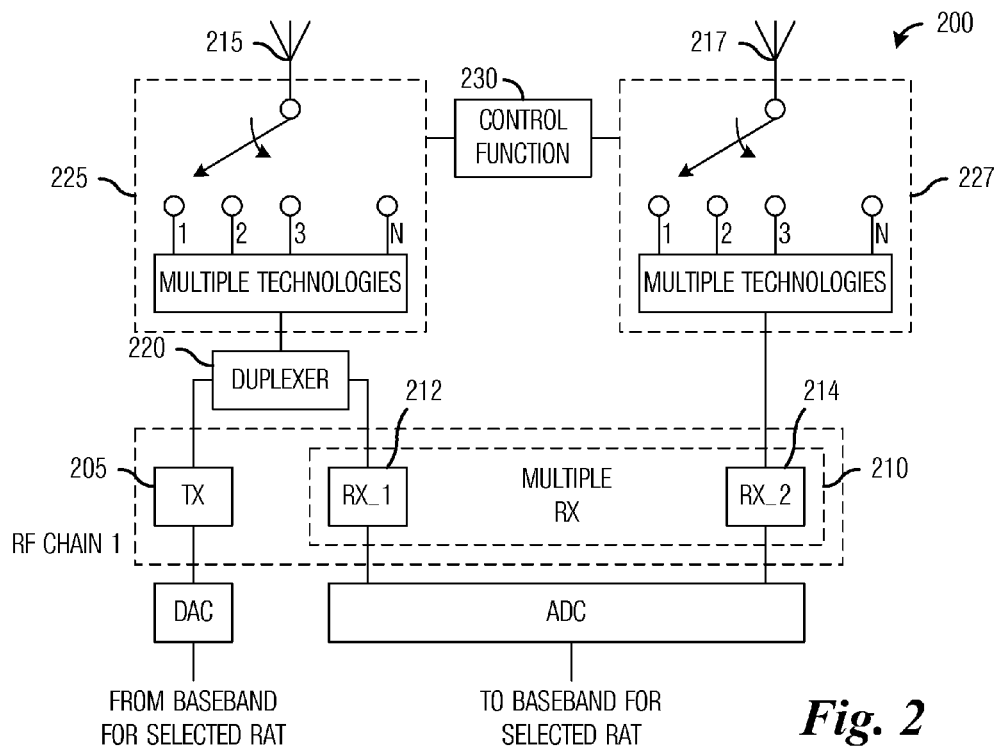
FIG. 2 is a diagram of a portion of a RF circuit of a UE having multiple receivers.

FIG. 2 illustrates a portion of a RF circuit 200 of a UE having multiple receivers. As shown in FIG. 2, RF circuit 200 includes a single RF chain (RF CHAIN 1) comprising one TX 205 and multiple RXs 210 that may all be connected to a single RAT circuit, i.e., the UE is in the second receiver configuration. The multiple RXs 210, such as RX_1 212 and RX_2 214, may enable a UE containing RF circuit 200 to be compliant to the 3GPP LTE Rev8 technical standard and support MIMO operation. TX 205 and RX__1 212 may share a first single antenna 215 through a duplexer (or RF switch) 220, while RX__2 214 may have exclusive use of a second single antenna 217. Although FIG. 2 illustrates two RXs (RX__1 212 and RX__2 214), RX 210 may include more than two RXs.

In order to support multiple RATs with the second receiver configuration, switches, such as a first switch 225 and a second switch 227, may be used to enable switching in and out of different RAT specific RF circuitry, including filters, amplifiers, frequency and RAT dependent circuits, and so forth. First switch 225 and second switch 227 may be controlled by a control function 230. Control function 230 may set the switch state of first switch 225 and second switch 227 based on network conditions, UE state, RAT being used, and so on. Control function 230 may be configured so that both first switch 225 and second switch 227 may be set to the same switch state, allowing both RX__1 212 and RX__2 214 to tune to the same RAT, thereby enabling MIMO operation.

In addition to setting switch state, control function 230 may also set control information that specifies the operation of other RF circuitry in RF circuit 200. For example, control function 230 may set control information that specifies the operation of TX 205, RX__1 212, RX__2 214, baseband processors, analog-to-digital converters, digital-to-analog converters, and so forth.

Since control function 230 controls both first switch 225 and second switch 227 with the same control signal, both RX__1 212 and RX__2 214 must tune to a single RAT at any given time. Therefore, to provide support for the ability to simultaneously tune to multiple RATs, an additional RF chain may need to be added to RF circuit 200 at additional expense, power consumption, size, and so on.

The multiple receivers are typically used to support MIMO operation in a current RAT and provide improved performance through antenna diversity, beam forming, and so forth. However, it may be possible to use the multiple receivers independently to help reduce handover delay, reduce drop call rates, and so forth, especially in situations wherein a UE is operating in a border cell where network conditions may not be conducive to MIMO operation. In such a situation, it may be possible to tune one of the multiple receivers to an alternate RAT, wherein the receiver tuned to the alternate RAT may be able to obtain information related to the alternate RAT, which may help expedite an inter-RAT handover. Since one or more other receivers remain tuned to the current RAT, the connection or call between the UE and the current RAT is maintained.

However, in order to support both MIMO operation and tuning to alternate RATs and minimize the number of receivers in a UE, an alternate type of receiver may be needed. A fully configurable receiver that can be connected to multiple RAT circuits, as well as different receive antennas, may be needed to support MIMO operation and tuning to alternate RATs while minimizing the number of receivers in a UE.

Figure 3A:
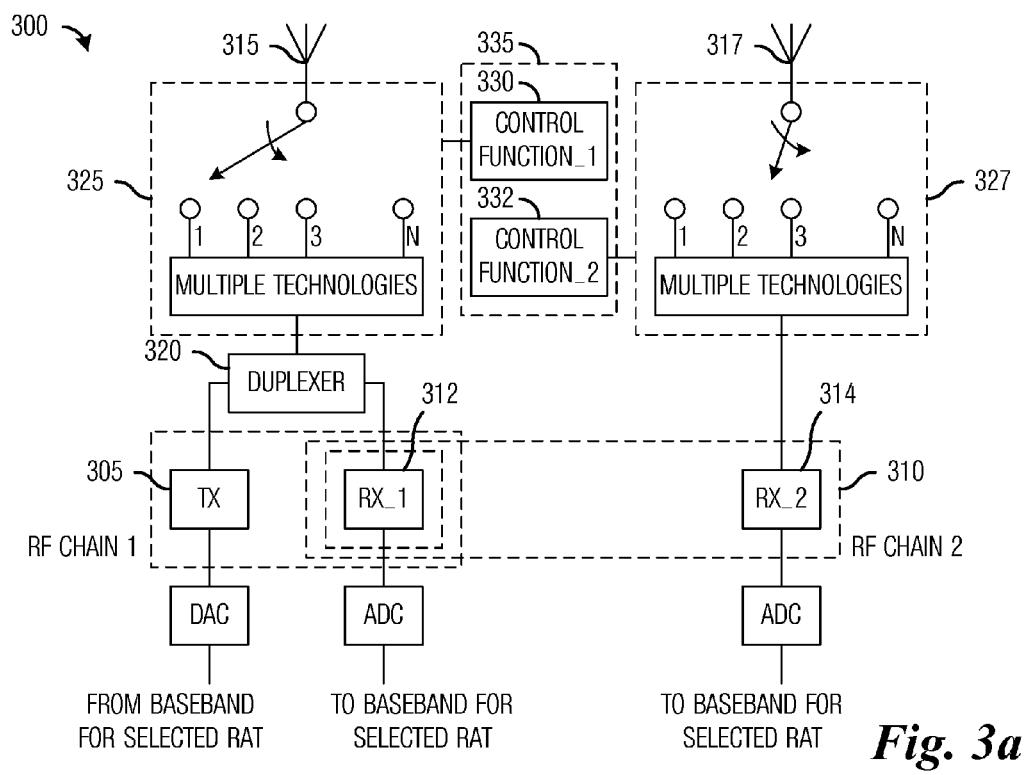
FIG. 3a is a diagram of a portion of a RF circuit of a UE.

FIG. 3*a* illustrates a portion of a RF circuit 300 of a UE. As shown in FIG. 3*a*, RF circuit 300 includes two RF chains (RF CHAIN 1 and RF CHAIN 2). RF CHAIN 1 comprises one TX 305 and one fully configurable receiver RX__1 312, while RF CHAIN 2 comprises one fully configurable receiver RX__2 314. Collectively, fully configurable receiver RX__1 312 and fully configurable receiver RX__2 314 form RX 310. TX 305 and fully configurable receiver RX__2 312 may share a first single antenna 315 through a duplexer (or RF switch) 320, while fully configurable receiver RX__2 314 may have exclusive use of a second single antenna 317. Fully configurable receiver RX__1 312 and fully configurable receiver RX__2 314 may independently connect to different RAT circuits.

Although shown in FIG. 3*a* as having two fully configurable receivers, a UE may have any number of fully configurable receivers, such as two, three, four, five, six, and so forth. A limit on the number of fully configurable receivers may be technical standard requirements as well as available silicon space for implementing fully configurable receivers, antennas, baseband processors, and so forth. Therefore, the illustration and discussion of two fully configurable receivers should not be construed as being limiting to either the scope or the spirit of the embodiments.

In order to support fully configurable receiver operation (e.g., MIMO operation and tuning to multiple RATs), switches, such as first switch 325 and second switch 327, may be used to enable switching in and out of different RAT specific RF circuitry, including filters, amplifiers, frequency and RAT dependent circuits, and so forth. First switch 325 may be controlled by first control function (CONTROL FUNCTION__1) 330 and second switch 327 may be controlled by a second control function (CONTROL FUNCTION__2) 332. First control function 330 may set the switch state of first switch 325 and second control function 332 may set the switch state of second switch 327 based on network conditions, UE state, RAT being used, and so on.

First control function 330 and second control function 332 may be implemented as two independent control functions or they may be implemented as a single global control function 335. In addition to setting switch states, first control function 330 and second control function 332 may also set control information that specifies the operation of other RF circuitry in RF circuit 300. For example, first control function 330 and second control function 332 may set control information that specifies the operation of TX 305, fully configurable receiver RX__1 312, fully configurable receiver RX__2 314, baseband processors, analog-to-digital converters, digital-to-analog converters, and so forth.

First control function 330 and second control function 332 may be configured to operate in unison so that first switch 325 and second switch 327 may be set to the same switch states, allowing both fully configurable receiver RX__1 312 and fully configurable receiver RX__2 314 to tune to the same RAT, thereby enabling MIMO operation. First control function 330 and second control function 332 may also be configured to operate independently so that first switch 325 and second switch 327 may be set to different switch states, allowing fully configurable receiver RX__1 312 and fully configurable receiver RX__2 314 to independently tune to different RATs.

When the fully configurable receivers are tuned to different RATs, different baseband processing may be necessary. For example, if fully configurable receiver RX__1 312 is receiving LTE transmissions and fully configurable receiver RX__2 314 is receiving CDMA transmissions, LTE baseband processing may be needed to process signals received by fully configurable receiver RX__1 312, while CDMA baseband processing may be needed to process signals received by fully configurable receiver RX__2 314.

In addition to setting switch states, first control function 330 and second control function 332 may also be used to select baseband processing for the signals received by the fully configurable receivers. For example, if first control function 330 selects LTE for fully configurable receiver RX__1 312, then LTE baseband processing is also selected to process the LTE signals received by antenna 315. Similarly, if second control function 332 selects CDMA for fully configurable receiver RX_2 314, then CDMA baseband processing is also selected to process CDMA signals received by antenna 317.

The ability to independently tune the fully configurable receivers of the UE to different RATs may enable the UE to tune to an alternate RAT and obtain information related to the alternate RAT, while maintaining its connection with a current RAT. The information related to the alternate RAT may help to expedite an inter-RAT handover, i.e., reduce the inter-RAT handover delay, when needed. Furthermore, established connections with both the current RAT and the alternate RAT may help to reduce the probability of a dropped connection.

FIG. 3b illustrates a UE 350. UE 350 includes a processor 355, a memory 360, and RF circuit 300. Processor 355 may be used to execute applications and programs, as well as a user interface, to allow a user to communicate, share data, multimedia, and so forth, with servers and other users wirelessly connected to the user. Memory 360 may be used to store the applications, programs, data, multimedia, and so forth. RF circuit 300 may be used to allow UE 350 to wirelessly connect to a wireless communications network and transmit and receive data, multimedia, and so on. RF circuit 300 includes a single receiver with multiple fully configurable receivers that can be independently tuned to different RATs to help reduce inter-RAT handover delay and decrease drop connection rates.

Figure 4:
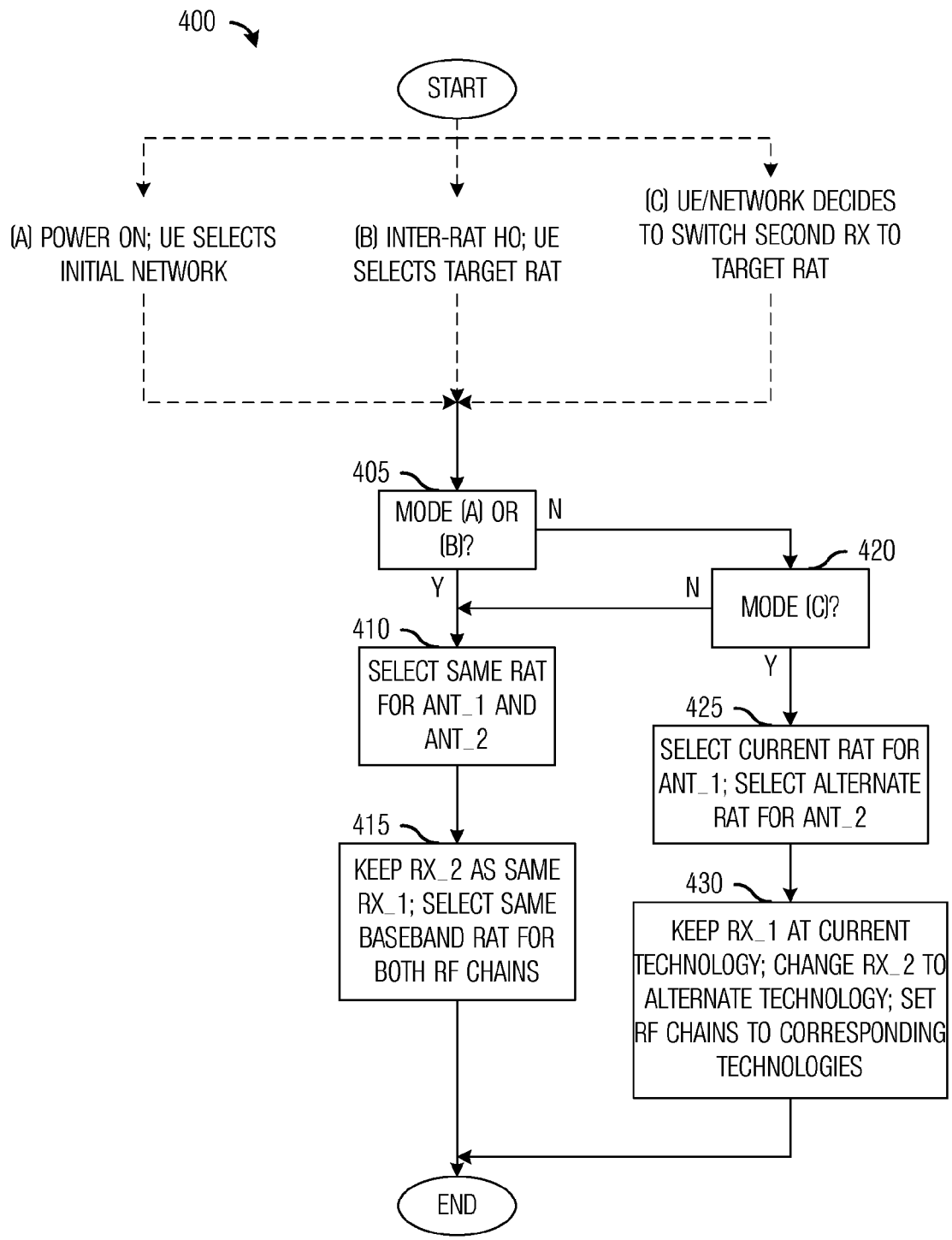
FIG. 4 is a flow diagram of operations in a global control function.

FIG. 4 illustrates a flow diagram of operations 400 in a global control function, such as global control function 335. Operations 400 may be indicative of operations taking place in the global control function as a UE is in a normal operating mode. Operations 400 may be in continuous operation while the UE remains in the normal operating mode.

Operations 400 may begin as the UE changes operating modes. The UE may change operating modes when (mode (A)) the UE initially powers on and selects an initial network (RAT); (mode (B)) the UE participates in an inter-RAT handover and the UE selects an alternate RAT; and (mode (C)) the UE or current network that is serving the UE (current RAT) decides to switch a fully configurable receiver of the UE to an alternate RAT.

A check may be performed to determine the operating mode of the UE (block 405). If the UE is operating in mode (A) or mode (B), then the global control function may select the same RAT for a first antenna (ANT_1) and a second antenna (ANT_2) (block 410). The global control function may select the same RAT for both antennas by setting switches, such as first switch 325 and second switch 327, to the same switch states. In addition to setting switch states of the switches, global control function may also set control information that may be used to specify other RF circuitry (block 415). For example, global control function may set control information to keep a second fully configurable receiver, such as fully configurable receiver RX_2 314, tuned to the same RAT as a first fully configurable receiver, such as fully configurable receiver RX_1 312, and select the same baseband processing for both RF chains. Operations 400 may then terminate.

If the UE is operating in mode (C) (blocks 405 and 420), then global control function may set switch states to that the first antenna remains tuned to a current RAT and the second antenna tunes to an alternate RAT (block 425). In addition to setting switch states of the switches, global control function may also set control information that may be used to specify of other RF circuitry (block 430). For example, global control function may set control information to keep the first fully configurable receiver tuned to the current RAT, while the second fully configurable receiver is tuned to the alternate RAT, and select corresponding baseband processing for both RF chains. Operations 400 may then terminate.

Although the above discussion focuses on a situation wherein one fully configurable receiver is retuned to the alternate RAT and one fully configurable receiver is kept tuned to the current RAT, the number of fully configurable receivers retuned to the alternate RAT and kept tuned to the current RAT may be dependent on factors such as a number of available fully configurable receivers. Therefore the discussion of retuning a single fully configurable receiver to the alternate RAT and keeping a single fully configurable receiver tuned to the current RAT should not be construed as being limiting to either the scope or the spirit of the present embodiments.

Figure 5A:
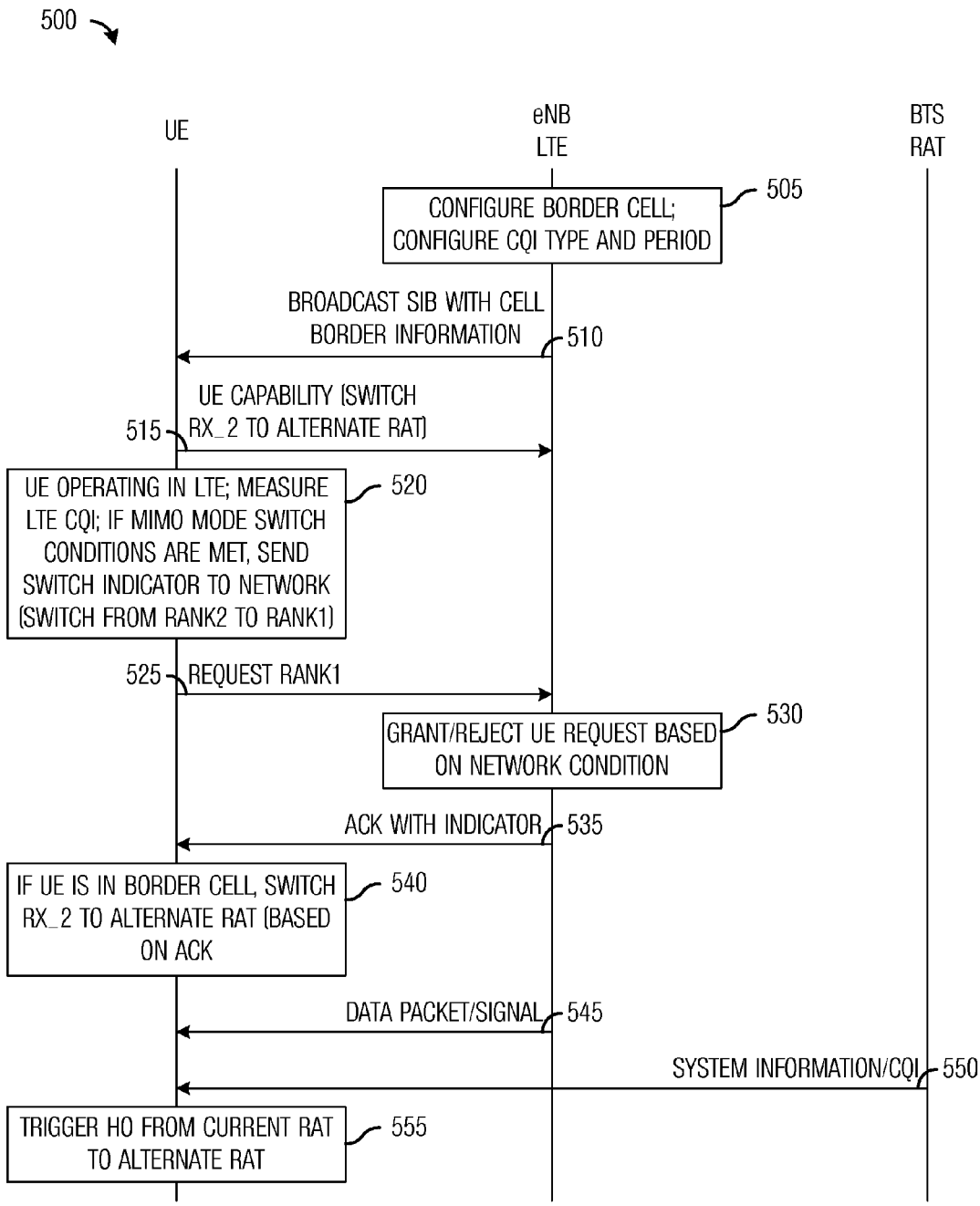
FIG. 5a is a diagram of a message exchange occurring in a UE controlled inter-RAT handover.

FIG. 5a illustrates a message exchange 500 occurring in a UE controlled inter-RAT handover. In a UE controlled inter-RAT handover, the UE decides to switch a second receiver (a second fully configurable receiver) to an alternate RAT without the knowledge of the eNB serving the UE and the UE triggers the inter-RAT handover.

Message exchange 500 may begin with the eNBs in a first wireless communications network configuring their border cells, i.e., cells that are on a border between the first wireless communications network, wherein the first wireless communications network uses a first RAT (RAT_1), and a second wireless communications network, wherein the second wireless communications network uses a second RAT (RAT_2). For example, configuring border cells may involve using channel quality indicator (CQI) from a physical layer or reference signal received power (RSRP) from radio resource control (RRC) layer three (3) for DL measurement and reporting to define border cells in the first wireless communications network.

In addition to configuring its border cells, the eNBs may configure a desired CQI type, such as signal plus interference to noise ratios, channel estimates, precoding matrix indication, rank indication, precoding vector values, precoding vector indices, and so forth, and a CQI reporting period (block 505). After configuring the border cells, CQI type, CQI reporting period, and so forth, the eNBs may broadcast the information in a system information broadcast (SIB) to UEs operating in the first wireless communications network (event 510). The SIB may include border cell information.

The UE (initially operating in the first wireless communications network (e.g., LTE)), as it moves around the first wireless communications network, may measure channel and network conditions and determine that conditions are suitable for switching one of its fully configurable receivers to an alternate RAT, such as when the UE moves from a cell center to a cell edge or vice versa. The UE may report the CQI to its serving eNB (event 515). In addition to reporting the CQI to the serving eNB, the UE may also report its capability, e.g., its ability to switch a fully configurable receiver to an alternate RAT.

If the measured channel and network conditions meet MIMO mode switch conditions, then the UE switch from MIMO Rank 2 to MIMO Rank 1 (block 520). For example, assume that 2×2 MIMO is implemented in the first wireless communications network, then when the UE is in or near a cell center, Rank 2 (2×2 MIMO) may be used. To achieve Rank 2 MIMO communications two fully configurable receivers are required. When the UE moves towards a cell edge, signal quality begins to drop and Rank 1 (transmit diversity) may be used. To achieve Rank 1 MIMO, one fully configurable receiver may be used.

The MIMO mode switch may be based on a downlink signal strength, for example. Based on the downlink signal strength, the UE may select to use either Rank 1 or Rank 2

MIMO communications. To accomplish a MIMO mode switch, the UE may transmit a request to the first wireless communications network requesting that it be allowed to switch from MIMO Rank 2 to MIMO Rank 1 operation or vice versa (event 525).

The eNB may either grant or reject the UE request for the MIMO mode switch (block 530) based on considerations such as downlink signal strength, network conditions, network loading, and so forth. The eNB may send an acknowledgement to the UE, wherein the acknowledgement may include an indicator that indicates whether the eNB has granted or rejected the UE's request for the MIMO mode switch (event 535).

If the eNB has granted the UE request for MIMO mode switch and if the UE is in a border cell, the UE may then decide to switch one of its fully configurable receivers, for example, second fully configurable receiver RX_2 314 to the alternate RAT (event 540). While the UE switches one of its fully configurable receivers to the alternate RAT, it also maintains its existing connection with the current RAT through one of its other fully configurable receivers, such as first fully configurable receiver RX_1 312.

With at least one fully configurable receiver tuned to the current RAT and at least one fully configurable receiver tuned to the alternate RAT, the UE may be able to receive transmissions from both RATs (events 545 and 550). Then, based on the received transmissions from both RATs, the UE may elect to trigger the inter-RAT handover from the current RAT to the alternate RAT (block 555). With existing connections to both the current RAT and the alternate RAT, the inter-RAT handover may occur more rapidly than in a situation wherein the UE does not have an existing connection with the alternate RAT, since a need to establish a connection with the alternate RAT and retrieve system information has been eliminated. Furthermore, with existing connections to both RATs, the UE may not need to break its connection to the current RAT before it attempts to establish a connection with the alternate RAT. By eliminating the need to break a connection with the current RAT prior to establishing a connection with the alternate RAT, the probability of a successful inter-RAT handover may increase.

Figure 5B:
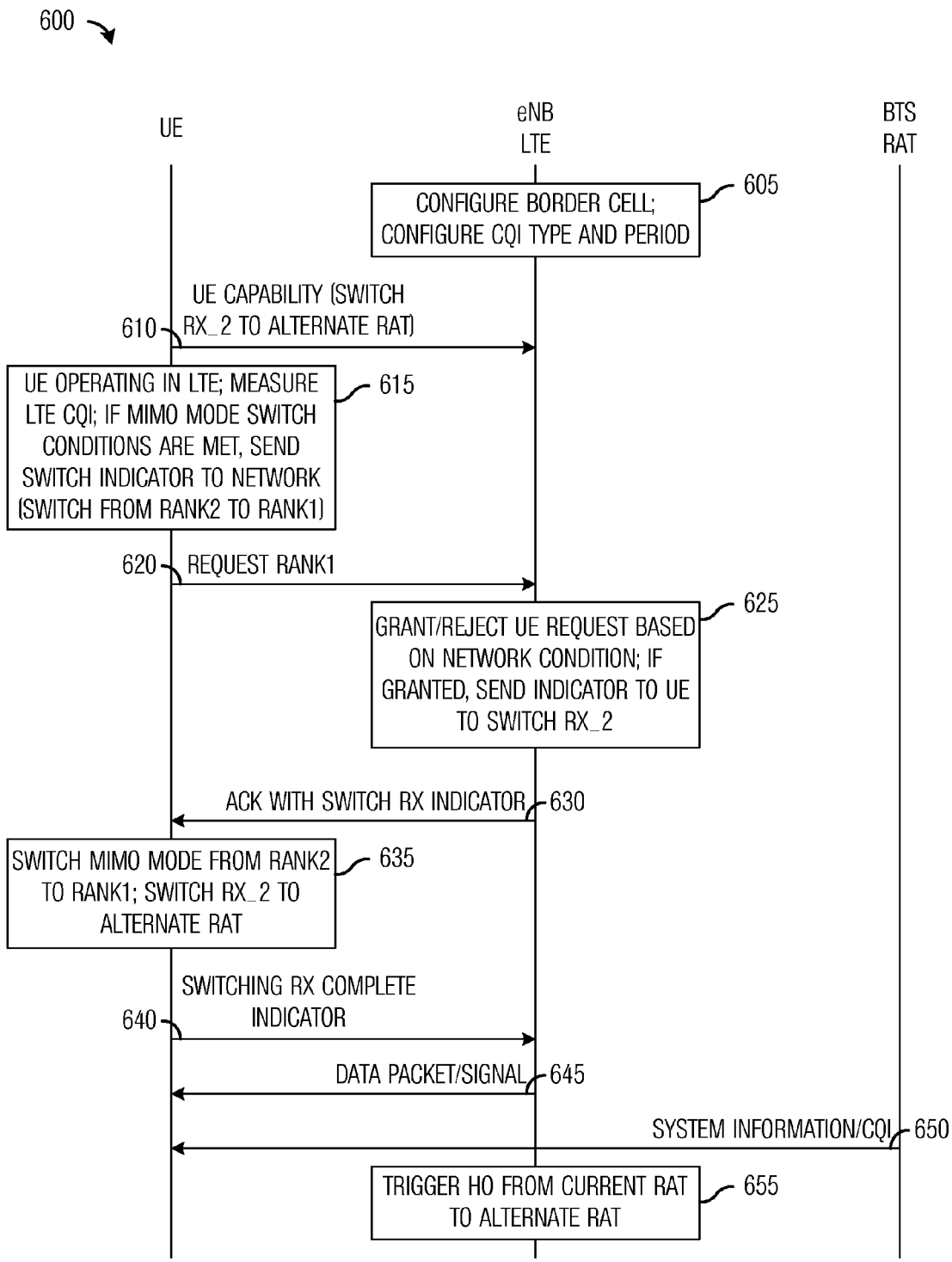
FIG. 5b is a diagram of a message exchange occurring in an eNB controlled inter-RAT handover.

FIG. 5b illustrates a message exchange 600 occurring in an eNB controlled inter-RAT handover. In an eNB controlled inter-RAT handover, the eNB decides to switch a UE's receiver to an alternate RAT. The eNB may make the decision based on factors such as downlink channel quality, network conditions, and so forth. Additionally, the eNB may trigger the inter-RAT handover.

Message exchange 600 may begin with the eNBs in the first wireless communications network configuring their border cells, i.e., cells that are on a border between the first wireless communications network, wherein the first wireless communications network uses a first RAT (RAT_1), and a second wireless communications network, wherein the second wireless communications network uses a second RAT (RAT_2). In addition to configuring its border cells, the eNB may configure a desired channel quality indicator (CQI) type, such as signal plus interference to noise ratios, channel estimates, precoding matrix indication, rank indication, precoding vector values, precoding vector indices, and so forth, and a CQI reporting period (block 605).

The UE (initially operating in a first wireless communications network (i.e., LTE)), as is moves around the first wireless communications network, may measure channel and network conditions and determines that conditions are suitable for switching one of its fully configurable receivers to an alternate RAT, such as when the UE moves from a cell center to a cell edge or vice versa. The UE may report the CQI to its serving eNB (event 610). In addition to reporting the CQI to the serving eNB, the UE may also report its capability, e.g., its ability to switch a fully configurable receiver to an alternate RAT.

If the measured channel and network conditions meet MIMO mode switch conditions, then the UE switch from MIMO Rank 2 to MIMO Rank 1 (block 615). For example, assume that 2×2 MIMO is implemented in the first wireless communications network, then when the UE is in or near a cell center, Rank 2 (2×2 MIMO) may be used. To achieve Rank 2 MIMO communications two fully configurable receivers are required. When the UE moves towards a cell edge, signal quality begins to drop and Rank 1 (transmit diversity) may be used. To achieve Rank 1 MIMO, one fully configurable receiver may be used.

The MIMO mode switch may be based on a downlink signal strength, for example. Based on the downlink signal strength, the UE may select to use either Rank 1 or Rank 2 MIMO communications. To accomplish a MIMO mode switch, the UE may transmit a request to the first wireless communications network requesting that it be allowed to switch from MIMO Rank 2 to MIMO Rank 1 operation or vice versa (event 620).

The eNB may either grant or reject the UE request for the MIMO mode switch (block 625) based on considerations such as downlink signal strength, network conditions, network loading, and so forth. For example, the eNB may grant or reject the UE request for the MIMO mode switch by comparing the measured channel quality reported by the UE with a threshold. If the measured channel quality is less than the threshold, then the eNB may grant the UE request, while if the measure channel quality is greater than the threshold, the eNB may reject the UE request.

In addition to granting or rejecting the UE request for the MIMO mode switch, the eNB may also decide based on the UE's position (is the UE in a border cell, for example), reported channel quality indicators (e.g., is the measured channel quality reported by the UE less than a threshold), the last time that the UE's MIMO mode was changed (to prevent a ping-pong situation wherein the UE continually changes MIMO mode), time advance (e.g., the UE is moving at a high speed or a low speed, and the UE's location estimation information), and so forth, to have the UE tune one of its fully configurable receivers, such as fully configurable receiver RX_2 314, to an alternate RAT.

According to a preferred embodiment, the eNB always makes use of the UE's position and its reported channel quality indicators to determine if the UE will tune one of its fully configurable receivers to the alternate RAT. While, conditions such as the last time that the UE's MIMO mode changed and time advance may be optional. For example, the eNB may consider the UE's position and its reported channel quality indicators plus the last time that the UE's MIMO mode changed to determine if the UE will tune one of its fully configurable receivers to the alternate RAT. Alternatively, the eNB may consider the UE's position and its reported channel quality indicators plus time advance to determine if the UE will tune one of its fully configurable receivers to the alternate RAT. In yet another alternative, the eNB may consider the UE's position and its reported channel quality indicators plus time advance and the last time that the UE's MIMO mode changed to determine if the UE will tune one of its fully configurable receivers to the alternate RAT.

If the eNB decides that the UE should tune one of its fully configurable receivers to the alternate RAT, then the eNB may send an acknowledgement to the UE, wherein the acknowledgement may include a switch receiver indicator that indicates whether to switch one of its fully configurable receivers to the alternate RAT (event 630). The switch receiver indicator may be implemented as a single bit in a physical layer message that tells the UE to retune a fully configurable receiver from the current RAT to the alternate RAT, for example. The acknowledgement may include information about the alternate RAT to assist the UE in retuning its fully configurable receiver. The acknowledgement may also include an indicator that indicates whether the eNB has granted or rejected the UE's request for the MIMO mode switch.

If the eNB has granted the UE request for MIMO mode switch, then the UE switches from Rank 2 to Rank 1 MIMO operation (block 635). Additionally, if the eNB decided that the UE should tune one of its fully configurable receivers to the alternate RAT, then the UE tunes one of its fully configurable receivers to the alternate RAT. Once the retuning completes, the UE may send a message with a switching receiver complete indicator to the eNB (event 640). The switching receiver complete indicator may indicate to the eNB that the retuning of the fully configurable receiver has completed. The switching receiver complete indicator may be implemented as a single bit in a physical layer message, for example.

With at least one fully configurable receiver tuned in to the current RAT and at least one fully configurable receiver tuned to the alternate RAT, the UE may be able to receive transmissions from both RATs (events 645 and 650). Then the eNB may elect to trigger the inter-RAT handover from the current RAT to the alternate RAT (block 655). The triggering of the inter-RAT handover may be based on information received from the alternate RAT, and may include: reference signal received power (RSRP), time advance, load balance, blind handover, and so forth.

With existing connections to both the current RAT and the alternate RAT, the inter-RAT handover may occur more rapidly than in a situation wherein the UE does not have an existing connecting with the alternate RAT, since a need to establish a connection with the alternate RAT, synchronize with the alternate RAT, retrieve system information as well as a hash has been eliminated. Furthermore, with existing connections to both RATs, the UE may not need to break its connection to the current RAT before it attempts to establish a connection with the alternate RAT. By eliminating the need to break a connection with the current RAT prior to establishing a connection with the alternate RAT, the probability of a successful inter-RAT handover may increase.

In addition to receiving an indication from the eNB to tune one of its fully configurable receivers to the alternate RAT (i.e., network controlled mode switch), the UE may make its own decision to tune one of its fully configurable receivers to the alternate RAT (i.e., UE controlled mode switch). An advantage of UE controlled mode switching is that the mode switching may be performed autonomously without interaction from the eNB. Additionally, UE controlled mode switching may be achieved with very little to no modifications to the air interface.

Figure 6A:
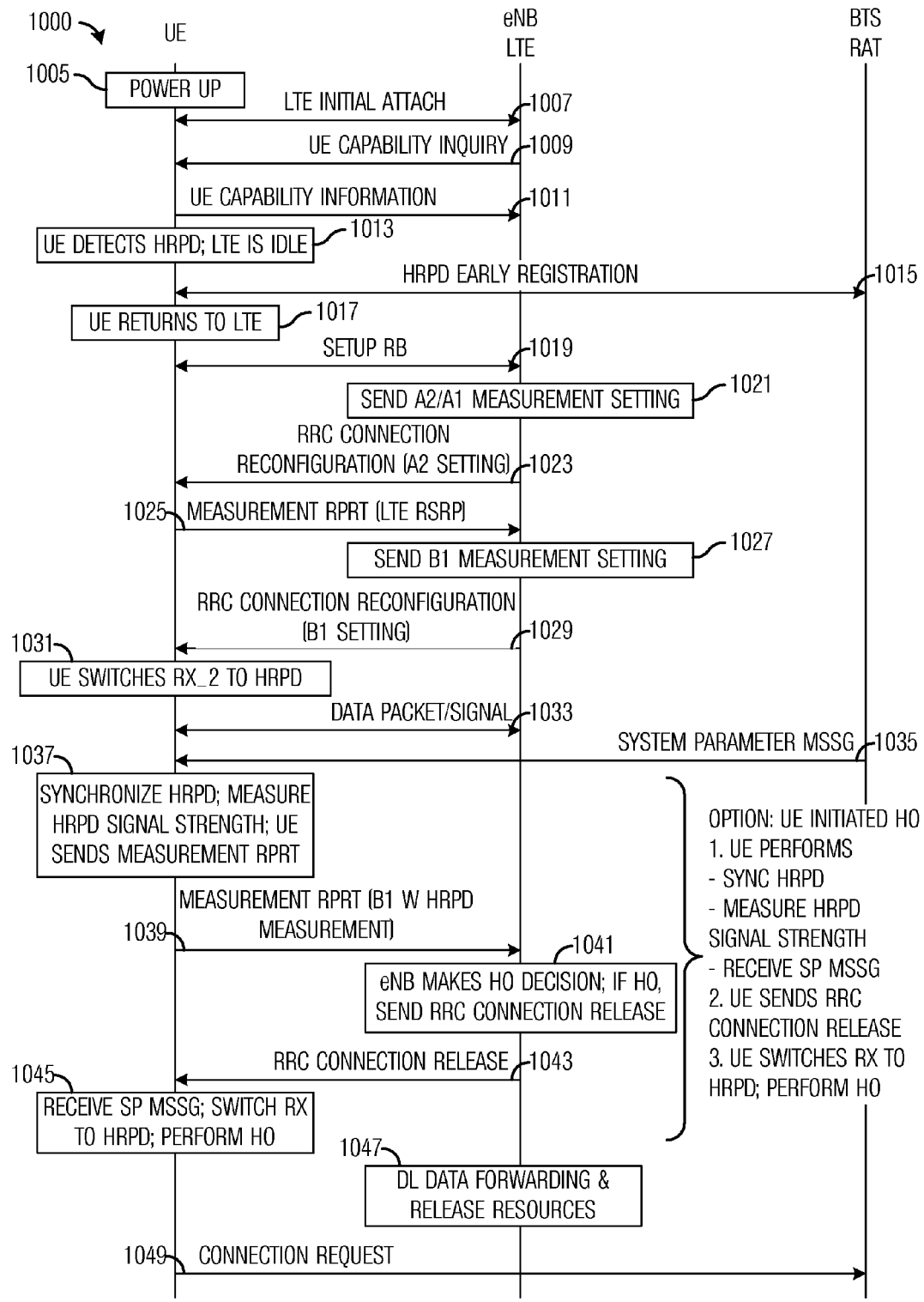
FIG. 6a is a diagram of a message exchange occurring in a UE controlled mode switch in a UE controlled inter-RAT handover.

FIG. 6a illustrates a message exchange 1000 occurring in a UE controlled mode switch in a UE controlled inter-RAT handover. With a UE controlled mode switch, the UE may, on its own, decide to tune one of its fully configurable receivers to the alternate RAT. The UE may make the decision based on a comparison of a measurement, such as CQI or RSRP, with a threshold.

Message exchange 1005 may begin with the UE powering up (block 1005). As the UE powers up, it may not be attached to any communications network and may need to join a communications network that it is capable of detecting. For discussion purposes, let the UE detect a LTE communications network.

After the UE detects the LTE communications network, the UE and an eNB in the LTE communications network perform an initial LTE attachment, wherein messages may be exchanged between the UE and the eNB (event 1007). The messages exchanged between the UE and the eNB may allow the eNB to authenticate and authorize the UE, as well as provide system information that will allow the UE to operate in the LTE communications network.

The eNB may also inquire about the UE capabilities, for example, if the UE is capable of operating in switching operating mode or able to switch at least one of its fully configurable receivers to an alternate RAT (event 1009). The UE may respond to the inquiry from the eNB with a message that reports the UE's capabilities to the eNB (event 1011). For example, if the UE is capable of operating in switching operating mode or switching at least one of its fully configurable receivers to an alternate RAT, then the message may include indications indicating such information.

The UE may now be in a normal operating mode with the LTE communications network.

While in normal operations with the LTE communications network and not actively participating in a transmission, i.e., the UE is idle, the UE may detect the presence of a HRPD communications network (or some other communications network, such as CDMA, WiMAX, LTE-A, UMTS, and so forth) (block 1013). Since the UE is idle, the UE may attempt to register with the HRPD communications network (event 1015). The registration with the HRPD communications network may involve exchanging transmissions with a base terminal station (BTS) in the HRPD communications network and may involve authenticating and authorizing the UE, as well as retrieving system information from the HRPD communications network. Once the registration with the HRPD communications network completes, the UE may return to the LTE communications network. (block 1017).

According to a preferred embodiment, the registration of the UE with the HRPD communications network may involve the use of a single transmitter and one fully configurable receiver of the UE. Therefore, in a UE with multiple fully configurable receivers, the UE may still remain connected to the LTE communications network. However, if the UE has only one transmitter, the UE will only be able to receive incoming LTE messages and not transmit LTE messages. Generally, the registration of the UE with the HRPD communications network or any other communications network may consume a lot of time and any LTE transmissions may be queued until the registration process completes.

When there is a transmission to or from the UE, resource blocks (RBs) must be configured and allocated for use with the UE (event 1019) and the eNB may decide to transmit A2/A1 measurement settings to the UE (block 1021). The eNB may transmit the A2/A1 measurement settings in a radio resource control (RRC) connection reconfiguration message with A2 settings to the UE (event 1023). In response, the UE may measure a communications channel between itself and the eNB and send the results (either the measurement itself or a representation thereof) to the eNB in a measurement report (event 1025).

The eNB may then decide to transmit B1 measurement settings to the UE (block 1027). The decision to send B1 measurement settings may be based on factors such as UE support, communications channel measurement, network conditions, and so forth. The eNB may transmit the B1 measurement settings in the form of a RRC connection reconfiguration message with the B1 settings (event 1029).

Upon receipt of the RRC connection reconfiguration message with the B1 settings, the UE may compare a channel measurement, such as CQI and/or RSRP, with a threshold and if the channel measurement is below the threshold, for example, then the UE may tune at least one fully configurable receiver to the alternate RAT (e.g., the HRPD communications network) (event 1031). The UE decided on its own, based on channel measurements, to tune one of its fully configurable receivers to the alternate RAT. The UE maintains at least one fully configurable receiver tuned to the LTE communications network while the at least one fully configurable receiver is tuned to the HRPD communications network. Therefore, the UE may be able to receive transmissions from both the LTE communications network and while retrieving system information from the HRPD communications network (event 1033 and event 1035).

With the system information from the HRPD communications network, the UE may synchronize with the HRPD communications network. In addition, the UE may measure the signal strength of transmissions from the HPRD communications network and send a measurement report (block 1037). The UE may send a measurement report containing the measured signal strength of the HRPD communications network to the eNB (event 1039). Based on the measured signal strength of the HRPD communications network, the eNB may decide to handover the UE to the HRPD communications network (block 1041). If the eNB decides to handover the UE to the HRPD communications network, the eNB may transmit a RRC connection release message to the UE (event 1043).

The RRC connection release message may be used as an initiator for the inter-RAT handover. After the UE receives the RRC connection release message, which may contain system parameters (SP), the UE may switch all of its fully configurable receivers to the HRPD communications network and participate in the inter-RAT handover (block 1045). Since the UE already has system parameters for the HRPD communications network, the inter-RAT handover may proceed rapidly with small probability of failure. With the inter-RAT handover complete, the eNB may initiate a forwarding of all downlink data intended for the UE to the HRPD communications network and release resources allocated to the UE (block 1047). The UE may transmit a connection request to the HRPD communications network to fully establish its connection with the HRPD communications network (event 1049).

Figure 6B:
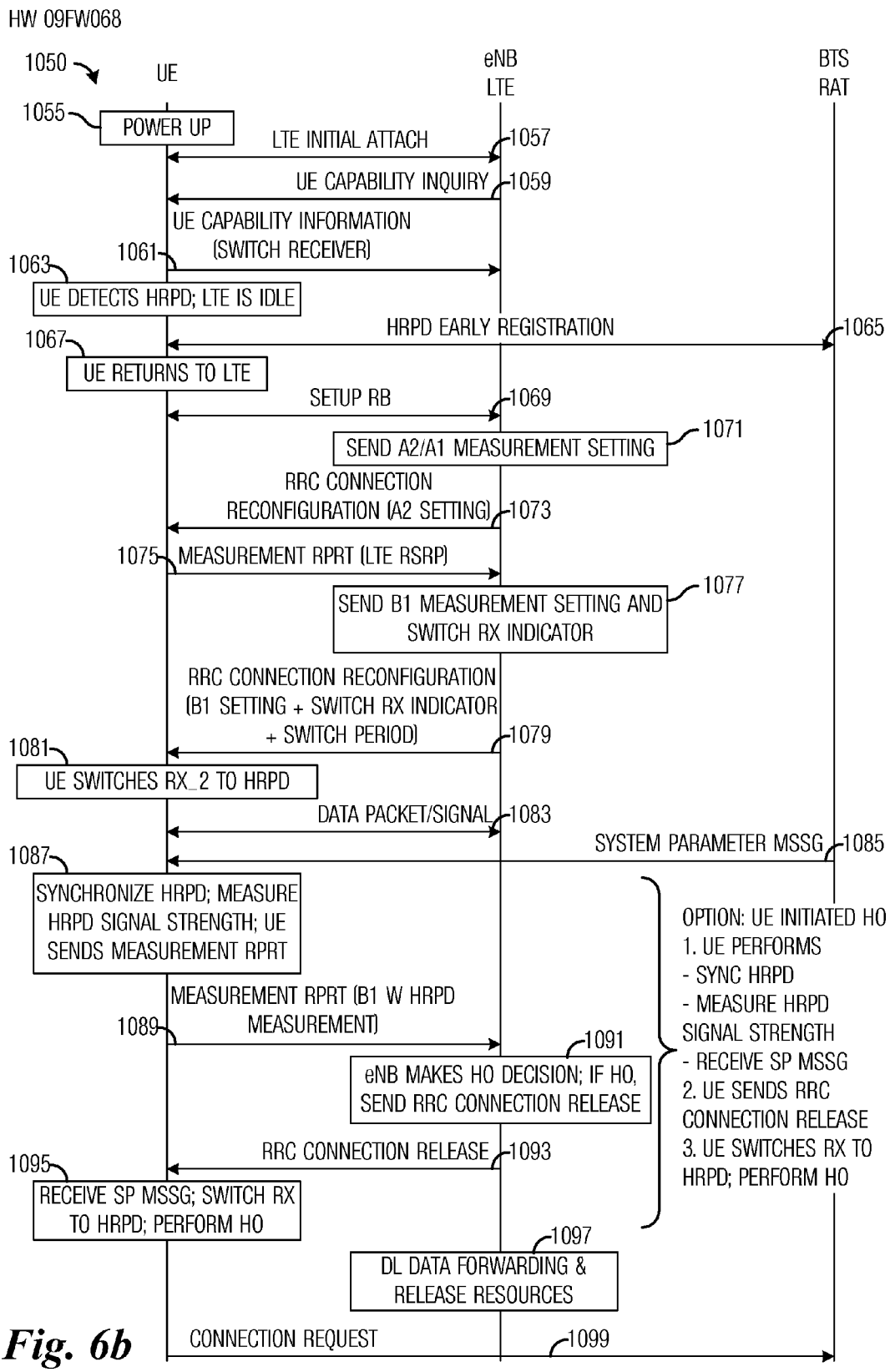
FIG. 6b is a diagram of a message exchange occurring in an eNB controlled mode switch in an eNB controlled inter-RAT handover.

FIG. 6b illustrates a message exchange 1050 occurring in an eNB controlled mode switch in an eNB controlled inter-RAT handover. With an eNB controlled mode switch, the UE may be instructed to tune one of its fully configurable receivers to the alternate RAT. The instruction to tune one of its fully configurable receivers to the alternate RAT may be sent to the UE by the eNB in the form of a RRC message.

Message exchange 1050 may begin with the UE powering up (block 1055). As the UE powers up, it may not be attached to any communications network and may need to join a communications network that it is capable of detecting. For discussion purposes, let the UE detect a LTE communications network.

After the UE detects the LTE communications network, the UE and an eNB in the LTE communications network perform an initial LTE attachment, wherein messages may be exchanged between the UE and the eNB (event 1057). The messages exchanged between the UE and the eNB may allow the eNB to authenticate and authorize the UE, as well as provide system information that will allow the UE to operate in the LTE communications network.

The eNB may also inquire about the UE capabilities, for example, if the UE is capable of operating in switching operating mode or able to switch at least one of its fully configurable receivers to an alternate RAT (event 1059). The UE may respond to the inquiry from the eNB with a message that reports the UE's capabilities to the eNB (event 1061). For example, if the UE is capable of operating in switching operating mode or switching at least one of its fully configurable receivers to an alternate RAT, then the message may include indications indicating such information.

The UE may now be in a normal operating mode with the LTE communications network.

While in normal operations with the LTE communications network and not actively participating in a transmission, i.e., the UE is idle, the UE may detect the presence of a HRPD communications network (or some other communications network, such as CDMA, WiMAX, LTE-A, UMTS, and so forth) (block 1063). Since the UE is idle, the UE may attempt to register with the HRPD communications network (event 1065). The registration with the HRPD communications network may involve exchanging transmissions with a base terminal station (BTS) in the HRPD communications network and may involve authenticating and authorizing the UE, as well as retrieving system information from the HRPD communications network. Once the registration with the HRPD communications network completes, the UE may return to the LTE communications network. (block 1067).

According to a preferred embodiment, the registration of the UE with the HRPD communications network may involve the use of a single transmitter and one fully configurable receiver of the UE. Therefore, in a UE with multiple fully configurable receivers, the UE may still remain connected to the LTE communications network. However, if the UE has only one transmitter, the UE will only be able to receive incoming LTE messages and not transmit LTE messages. Generally, the registration of the UE with the HRPD communications network or any other communications network does consume a lot of time and any LTE transmissions may be queued until the registration process completes.

When there is a transmission to or from the UE, resource blocks (RBs) must be configured and allocated for use with the UE (event 1069) and the eNB may decide to transmit A2/A1 measurement settings to the UE (block 1071). The eNB may transmit the A2/A1 measurement settings in a radio resource control (RRC) connection reconfiguration message with A2 settings to the UE (event 1073). In response, the UE may measure a communications channel between itself and the eNB and send the results (either the measurement itself or a representation thereof) to the eNB in a measurement report (event 1075).

The eNB may then decide to transmit B1 measurement settings and a switch fully configurable receiver indicator to the UE (block 1077). The decision to send B1 measurement settings and the switch fully configurable receiver indicator may be based on factors such as UE support, communications channel measurement, network conditions, and so forth. The eNB may transmit the B1 measurement settings and the switch fully configurable receiver indicator in the form of a RRC connection reconfiguration message with the B1 settings, the switch fully configurable receiver indicator, and optionally, a switch period. The switch period may specify a duration that the UE should switch the fully configurable receiver (event 1079). Alternatively, separate RRC messages may be used to transmit the switch fully configurable receiver indicator and the optional switch period.

Upon receipt of the RRC connection reconfiguration message with the B1 settings, the UE may tune at least one fully configurable receiver to the alternate RAT (e.g., the HRPD communications network) (block 1081). The UE maintains at least one fully configurable receiver tuned to the LTE communications network while the at least one fully configurable receiver is tuned to the HRPD communications network. Therefore, the UE may be able to receive transmissions from both the LTE communications network and while retrieving system information from the HRPD communications network (event 1083 and event 1085).

With the system information from the HRPD communications network, the UE may synchronize with the HRPD communications network. In addition, the UE may measure the signal strength of transmissions from the HRPD communications network and send a measurement report (block 1087). The UE may send a measurement report containing the measured signal strength of the HRPD communications network to the eNB (event 1089). Based on the measured signal strength of the HRPD communications network, the eNB may decide to handover the UE to the HRPD communications network (block 1091). If the eNB decides to handover the UE to the HRPD communications network, the eNB may transmit a RRC connection release message to the UE (event 1093).

The RRC connection release message may be used as an initiator for the inter-RAT handover. After the UE receives the RRC connection release message, which may contain carrier frequency or band class information, the UE may switch all of its fully configurable receivers to the HRPD communications network and participate in the inter-RAT handover (block 1095). Since the UE already has system parameters for the HRPD communications network, the inter-RAT handover may proceed rapidly with small probability of failure and short handover delay. With the inter-RAT handover complete, the eNB may initiate a forwarding of all downlink data intended for the UE to the HRPD communications network and release resources allocated to the UE (block 1097). The UE may transmit a connection request to the HRPD communications network to fully establish its connection with the HRPD communications network (event 1099).

Figures 7A, 7B:
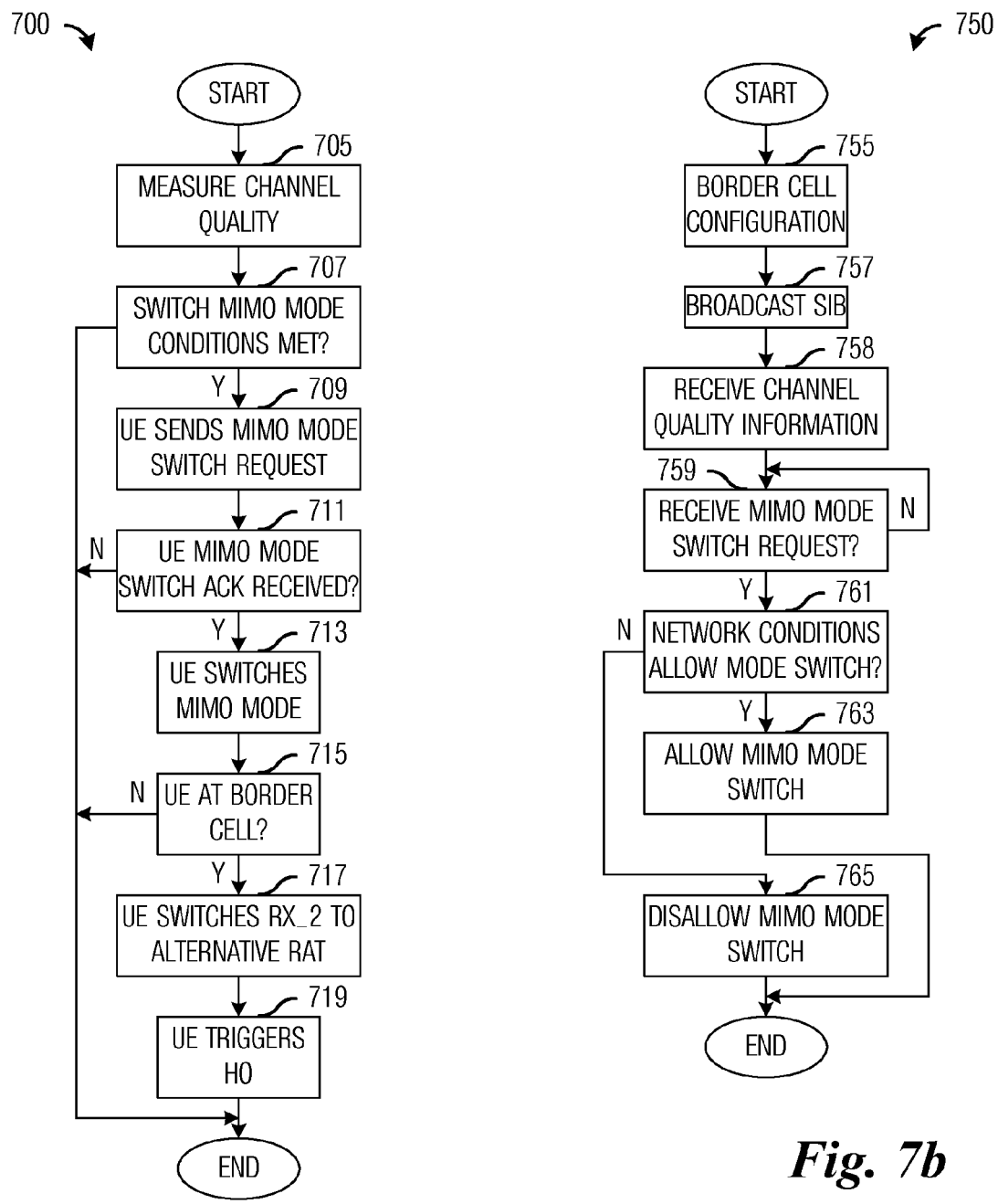
FIG. 7a is a flow diagram of UE operations in a UE controlled inter-RAT handover.
FIG. 7b is a flow diagram of eNB operations in a UE controlled inter-RAT handover.

FIG. 7a illustrates a flow diagram of UE operations 700 in a UE controlled inter-RAT handover. UE operations 700 may be indicative of operations occurring in a UE operating in a first wireless communications network (e.g., LTE) as the UE participates in a UE controlled inter-RAT handover to a second wireless communications network (e.g., CDMA). UE operations 700 may occur when the UE in the course of moving about a coverage area of the first wireless communications network moves to a cell edge and begins to experience a drop in signal quality of transmissions from the first wireless communications network and an increase in signal quality of transmissions from the second wireless communications network.

UE operations 700 may begin with the UE performing a measurement of channel quality of a communications channel between itself and an eNB that is serving the UE (block 705). From the channel quality measurement, the UE may be able to determine that it wishes to initiate an inter-RAT handover (block 707). For example, the channel quality measurement may be below a specified threshold.

If the channel quality measurement met the conditions required to initiate an inter-RAT handover, the UE may initiate an inter-RAT handover. If the channel quality measurement does not meet the conditions required to initiate an inter-RAT handover, then UE operations 700 may terminate.

In order to initiate an inter-RAT handover, the UE may send a MIMO mode switch request to its serving eNB (block 709). The MIMO mode switch request may be a request to switch from Rank 2 MIMO operation to Rank 1 MIMO operation. If the UE receives an acknowledgement back from the eNB containing an indication that indicates that the UE may perform the MIMO mode switch (block 711), then the UE may perform the MIMO mode switch (block 713).

If the UE receives an acknowledgement back from the eNB containing an indication that indicates that the UE may not perform the MIMO mode switch (block 711), then UE operation 700 may then terminate.

The UE may then perform a check to determine if it is operating at a border cell (block 715). The UE may check to determine if it is operating at a border cell by comparing the channel quality measurement with a second specified threshold, for example. Alternatively, the UE may use position estimation to determine if it is operating at a border cell. Alternatively, the UE may check to determine if it is operating at a border cell by detecting transmissions from the second wireless communications network. If the UE is operating at a border cell, then the UE may retune one of its fully configurable receivers (freed from MIMO operation due to the MIMO mode switch) to the second wireless communications network (block 717).

If the UE is not operating at a border cell (block 715), then UE operations 700 may then terminate.

Once the fully configurable receiver is tuned to the second wireless communications network and has been able to retrieve system information, system parameters, channel information, and so forth, the UE may trigger the inter-RAT handover (block 719). UE operations 700 may then terminate.

FIG. 7b illustrates a flow diagram of eNB operations 750 in a UE controlled inter-RAT handover. eNB operations 750 may be indicative of operations occurring at an eNB of a first wireless communications network as the network component participates in a UE controlled inter-RAT handover to a second wireless communications network.

eNB operations 750 may begin with the eNB configuring its border cells (block 755). In addition to configuring its border cells, the eNBs may configure a desired channel quality indicator (CQI) type, such as signal plus interference to noise ratios, channel estimates, precoding vector values, precoding vector indices, and so forth, and a CQI reporting period. The eNB may broadcast the information in a system information broadcast (SIB) to UEs that it is serving (block 757).

The eNB may also receive channel quality information from UEs that it is serving (block 758). The channel quality information may be actual measurements of the channel quality of a communications channel between a UE and the eNB. Alternatively, the channel quality information may be a representation of the actual measurements of the channel quality of the communications channel.

The eNB may perform a check to determine if it received a MIMO mode switch request from a UE that it is serving (block 759). If the eNB does not receive a MIMO mode switch request from a UE, then the eNB may periodically check to wait for such a request or eNB operations 750 may terminate.

If the eNB receives a MIMO mode switch request from a UE, then the eNB may check network conditions, channel quality indications, and so on, to determine if conditions are suitable for the UE to switch MIMO mode (block 761). If the conditions are suitable for the UE to switch MIMO mode, then the eNB may transmit an acknowledgement to the UE with an indicator indicating that the UE may perform the MIMO mode switch (block 763) and eNB operations 750 may terminate.

If the conditions are not suitable for the UE to switch MIMO mode, then the eNB may transmit an acknowledgement to the UE with an indicator indicating that the UE may not perform the MIMO mode switch (block 765) and eNB operations 750 may terminate.

Figures 8A, 8B:
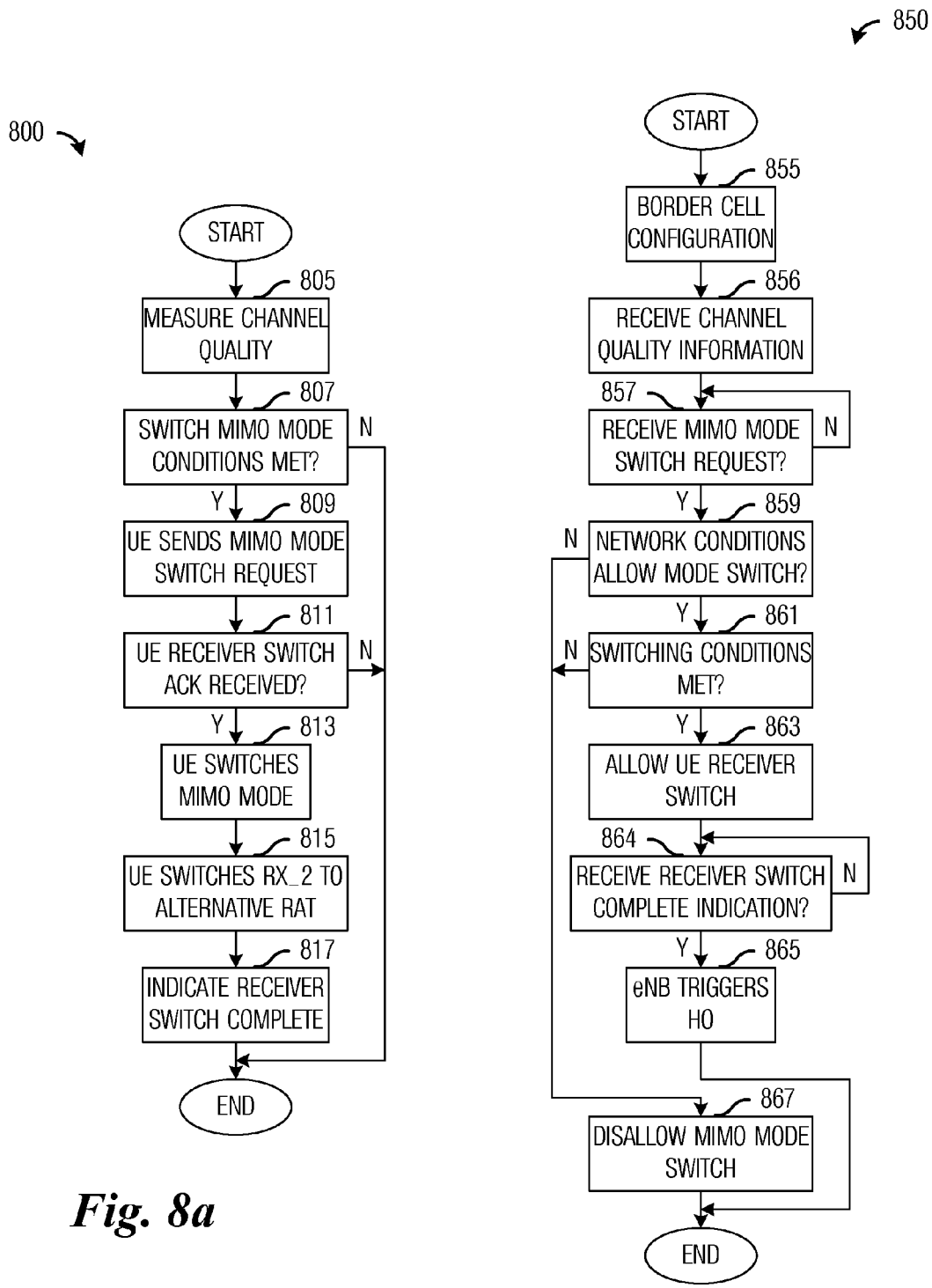
FIG. 8a is a flow diagram of UE operations in a network controlled inter-RAT handover.
FIG. 8b is a flow diagram of eNB operations in a network controlled inter-RAT handover.

FIG. 8a illustrates a flow diagram of UE operations 800 in a network controlled inter-RAT handover. UE operations 800 may be indicative of operations occurring in a UE operating in a first wireless communications network (e.g., LTE) as the UE participates in an eNB controlled inter-RAT handover to a second wireless communications network (e.g., CDMA). UE operations 800 may occur when the UE in the course of moving about a coverage area of the first wireless communications network moves to a cell edge and begins to experience a drop in signal quality of transmissions from the first wireless communications network and an increase in signal quality of transmissions from the second wireless communications network.

UE operations 800 may begin with the UE performing a measurement of channel quality of a communications channel between itself and an eNB that is serving the UE (block 805). From the channel quality measurement, the UE may be able to determine that it wishes to initiate an inter-RAT handover (block 807). For example, the channel quality measurement may be below a specified threshold.

If the channel quality measurement met the conditions required to initiate a MIMO mode switch, the UE may initiate an inter-RAT handover. If the channel quality measurement does not meet the conditions required to initiate a MIMO mode switch, then UE operations 800 may terminate.

In order to initiate a MIMO mode switch, the UE may send a MIMO mode switch request to its serving eNB (block 809). The MIMO mode switch request may be a request to switch from Rank 2 MIMO operation to Rank 1 MIMO operation. If the UE receives an acknowledgement back from the eNB containing an indication that indicates that the UE may perform the MIMO mode switch (block 811), then the UE may perform the MIMO mode switch (block 813).

If the UE receives an acknowledgement back from the eNB containing an indication that indicates that the UE may not perform the MIMO mode switch (block 811), then UE operation 800 may then terminate.

If allowed to perform the MIMO mode switch, the UE may perform the MIMO mode switch and then retune one of its fully configurable receivers (freed from MIMO operation due to the MIMO mode switch) to the alternate RAT (block 815). After the fully configurable receiver tunes to the alternate RAT, the UE may send a message containing an indication that the fully configurable receiver retuning is complete to the eNB (block 817) and UE operations 800 may then terminate.

FIG. 8b illustrates a flow diagram of eNB operations 850 in a network controlled inter-RAT handover. eNB operations 850 may be indicative of operations occurring at an eNB of a first wireless communications network as the network component participates in a UE controlled inter-RAT handover to a second wireless communications network.

eNB operations 850 may begin with the eNB configuring its border cells (block 855). In addition to configuring its border cells, the eNBs may configure a desired channel quality indicator (CQI) type, such as signal plus interference to noise ratios, channel estimates, precoding vector values, precoding vector indices, and so forth, and a CQI reporting period.

The eNB may also receive channel quality information from UEs that it is serving (block 856). The channel quality information may be actual measurements of the channel quality of a communications channel between a UE and the eNB. Alternatively, the channel quality information may be a representation of the actual measurements of the channel quality of the communications channel.

The eNB may perform a check to determine if it received a MIMO mode switch request from a UE that it is serving (block 857). If the eNB does not receive a MIMO mode switch request from a UE, then the eNB may periodically check to wait for such a request or eNB operations 850 may terminate.

If the eNB receives a MIMO mode switch request from a UE, then the eNB may check network conditions, channel quality indications, and so on, to determine if conditions are suitable for the UE to switch MIMO mode (block 859). For example, the eNB may grant or reject the UE request for the MIMO mode switch by comparing the measured channel quality reported by the UE with a threshold. If the measured channel quality is less than the threshold, then the eNB may grant the UE request, while if the measure channel quality is greater than the threshold, the eNB may reject the UE request.

If the conditions are suitable for the UE to switch MIMO mode, then the eNB may perform an additional check to determine if receiver switching conditions are met (block 861). The eNB may decide if receiver switching conditions are met based on the UE's position (is the UE in a border cell, for example), reported channel quality indicators (e.g., is the measured channel quality reported by the UE less than a threshold), the last time that the UE's MIMO mode was changed (to prevent a ping-pong situation wherein the UE continually changes MIMO mode), time advance (e.g., the UE is moving at a high speed or a low speed, and the UE's location estimation information), and so forth, to have the UE tune one of its fully configurable receivers, such as fully configurable receiver RX_2 314, to an alternate RAT.

As discussed previously, the eNB always makes use of the UE's position and its reported channel quality indicators to determine if the UE will tune one of its fully configurable receivers to the alternate RAT. While, conditions such as the last time that the UE's MIMO mode changed and time advance may be optional in determining if receiver switching conditions are met.

If both checks indicate that MIMO mode and receiver switching conditions are met, then the eNB may allow the UE to perform a receiver switch (block 863). The eNB may inform the UE by sending an acknowledgement back to the UE with an indicator indicating that the UE may perform the receiver switch (block 863). After the eNB receives an indication from the UE that indicates that the receiver switch is complete (block 864), the eNB may trigger the inter-RAT handover (block 865) and eNB operations 850 may terminate.

If the conditions are not suitable for the UE to switch MIMO mode or if the conditions are not suitable for the UE to perform a receiver switch, then the eNB may disallow the MIMO mode switch by transmitting an acknowledgement to the UE with an indicator indicating that the UE may not perform the MIMO mode switch (block 867) and eNB operations 850 may terminate.

In addition to switching a fully configurable receiver based on network conditions, such as when an inter-RAT handover may be imminent, wherein the switching may be controlled by either UE or eNB command, a UE may also enter a switching mode wherein it may switch one of its fully configurable receivers to the alternate RAT and then after a period of time, switch the fully configurable receiver back to the current RAT. While the fully configurable receiver is tuned to the alternate RAT, the UE may be able to retrieve system information pertaining to the alternate RAT, which may be helpful in expediting an inter-RAT handover should an inter-RAT handover become necessary.

The UE may enter the switching mode at its own discretion or upon instruction from its serving eNB. In either case, network status, such as channel quality indicators, network conditions, and so forth, may be a trigger for entering the switching mode. For example, the switching mode may be triggered when channel quality indicators as measured by the UEs and provided to their serving eNBs, drop below a specified threshold. Alternatively, the switching mode may be triggered when an eNB notices an error rate (or a number of negative acknowledgements to transmissions) exceeding a specified threshold.

In general, the switching mode may be periodic in nature, wherein the UE may switch one of its fully configurable receivers to the alternate RAT for a first specified amount of time and then switch the fully configurable receiver back to the current RAT for a second specified amount of time. Durations of the first specified amount of time and the second amount of time may be based on the nature of the RATs involved, network conditions, channel quality indicators, and so on. For example, the duration of the first specified amount of time should not be so great that the performance of the UE is significantly impacted. However, it should be long enough for the UE to tune into the alternate RAT and retrieve system information pertaining to the alternate RAT. Furthermore, when channel quality is low, the duration of the first specified amount of time may be increased to ensure that the UE is able to retrieve system information.

Similarly, the duration of the second specified amount of time should not be so great that the UE does not have sufficient opportunity to tune to the alternate RAT, synchronize with the alternate RAT, access system information and hash that may be helpful in expediting an inter-RAT handover and reduce dropped connection rates. While, if the duration of the second specified amount of time is too short, then the performance of the UE is greatly impacted due to the frequent loss of the use of one of the fully configurable receivers. Furthermore, when channel quality is low, the probability of an inter-RAT handover may increase, therefore, the duration of the second specified amount of time may be decreased to increase the number of times that the UE is able to access the alternate RAT and retrieve up-to-date system information.

FIG. 9a illustrates a flow diagram of UE operations 900 in switching mode operation, wherein the switching mode is initiated by a UE. UE operations 900 may be indicative of operations occurring in a UE operating in a first wireless communications network (e.g., LTE) as the UE participates in an eNB controlled inter-RAT handover to a second wireless communications network (e.g., CDMA). UE operations 900 may occur when the UE moves about a coverage area of the first wireless communications network.

UE operations 900 may begin with the UE performing a measurement of channel quality of a communications channel between itself and an eNB that is serving the UE (block 905). From the channel quality measurement, the UE may be able to determine that it wishes to initiate switching mode operation (block 907). For example, the channel quality measurement may be below a specified threshold.

If the UE does not wish to initiate switching mode operation, then UE operations 900 may then terminate.

If the UE does wish to initiate switching mode operation, then the UE may initialize a first switching timer and a second switching timer (block 909). According to an embodiment, the first switching timer may be used to control the duration of the first specified amount of time, i.e., the amount of time that one of the UE's fully configurable receivers spend tuned to the alternate RAT. The second switching timer may be used to control the duration of the second specified amount of time, i.e., the amount of time that the fully configurable receiver that is used to tune to the alternate RAT spends tuned to the current RAT. As discussed previously, the durations of the first specified amount of time and the second specified amount of time may be based on factors such as the nature of the RATs involved, network conditions, channel quality indicators, and so on.

With the first switching timer initialized, the UE may tune one of its fully configurable receivers to the alternate RAT (block 911) and keep it tuned to the alternate RAT until the first switching timer expires (block 913). According to an embodiment, the tuning of a fully configurable receiver to the alternate RAT may involve a request from an eNB serving the UE to alter MIMO operation mode, i.e., reduce from Rank 2 to Rank 1. Details involved in tuning a fully configurable receiver to the alternate RAT was described previously, such as in FIGS. 5a, 5b, 6a, 6b, 7a, 7b, 8a, and 8b and will not be repeated herein.

Once the first switching timer expires, the UE may retune the fully configurable receiver to the current RAT (block 915) and start the second switching timer to control how long the fully configurable receiver spends tuned to the current RAT (block 917). The fully configurable receiver may remain tuned to the current RAT until the second switching timer expires (block 919). Once the second switching timer expires, the UE may reset both the first switching timer and the second switching timer (block 921) and return to block 911 to retune the fully configurable receiver to the alternate RAT. UE operations 900 may continue until the UE no longer wishes to operate in switching mode. Alternatively, UE operations 900 may continue until the eNB instructs the UE to stop operating in switching mode.

FIG. 9b illustrates a flow diagram of UE operations 950 in switching mode operation, wherein the switching mode is initiated by an eNB. UE operations 900 may be indicative of operations occurring in a UE operating in a first wireless communications network (e.g., LTE) as the UE participates in an eNB controlled inter-RAT handover to a second wireless communications network (e.g., CDMA). UE operations 900 may occur when the UE moves about a coverage area of the first wireless communications network.

For eNB initiated switching mode operation, the eNB may specify periodic switching mode operation by specifying the amount of time that one of the UE's fully configurable receivers spends tuned to the alternate RAT and the amount of time that the fully configurable receiver that is used to tune to the alternate RAT spends tuned to the current RAT. The UE may then use the specified durations to tune and retune its fully configurable receivers. Alternatively, the eNB may initiate a retuning of one of the UE's fully configurable receivers to the alternate RAT and specify how long the fully configurable receiver should remain tuned to the alternate RAT. In yet another alternative embodiment, the eNB may send a first message to the UE to instruct it to tune one of its fully configurable receivers to the alternate RAT and then send a second message to the UE to instruct it to retune the fully configurable receiver back to the current RAT.

UE operations 950 may begin with the UE receiving a message from its serving eNB, wherein the message contains a switching indicator (block 955). The switching indicator may be used to instruct the UE to operate in switching mode. The UE may perform a check to determine if the eNB desires the UE to operate in periodic switching mode or if the eNB intends to send messages to the UE to instruct it when to change the tuning of its fully configurable receiver(s) (block 957).

If the UE is to operate in periodic switching mode, then the UE may also receive additional information, such as the duration of the first specified amount of time, i.e., the amount of time that one of the UE's fully configurable receivers spends tuned to the alternate RAT, the duration of the second specified amount of time, i.e., the amount of time that the fully configurable receiver that is used to tune to the alternate RAT spends tuned to the current RAT, and so forth. The additional information may be part of the message containing the switching indicator or the eNB may transmit the additional information to the UE in a separate message.

The UE may initialize a first switching timer and a second switching timer (block 959). According to an embodiment, the first switching timer may be used to control the duration of the first specified amount of time, i.e., the amount of time that one of the UE's fully configurable receivers spends tuned to the alternate RAT. The second switching timer may be used to control the duration of the second specified amount of time, i.e., the amount of time that the fully configurable receiver that is used to tune to the alternate RAT spends tuned to the current RAT. As discussed previously, the durations of the first specified amount of time and the second specified amount of time may be based on factors such as the nature of the RATs involved, network conditions, channel quality indicators, and so on.

With the first switching timer initialized, the UE may tune one of its fully configurable receivers to the alternate RAT (block 961) and keep it tuned to the alternate RAT until the first switching timer expires (block 963). According to an embodiment, the tuning of a fully configurable receiver to the alternate RAT may involve a request from an eNB serving the UE to alter MIMO operation mode, i.e., reduce from Rank 2 to Rank 1. Details involved in tuning a fully configurable receiver to the alternate RAT was described previously, such as in FIGS. 5a, 5b, 6a, 6b, 7a, 7b, 8a, and 8b and will not be repeated herein.

Once the first switching timer expires, the UE may retune the fully configurable receiver to the current RAT (block 965) and start the second switching timer to control how long the fully configurable receiver spends tuned to the current RAT (block 967). The fully configurable receiver may remain tuned to the current RAT until the second switching timer expires (block 969). Once the second switching timer expires, the UE may reset both the first switching timer and the second switching timer (block 971) and return to block 961 to retune the fully configurable receiver to the alternate RAT. UE operations 950 may continue until the eNB no longer wishes the UE to operate in switching mode.

If the UE is to not operate in periodic switching mode (block 957), then the eNB may specify a duration of time that the fully configurable receiver of the UE should be tuned to the alternate RAT. The duration may be included in the same message used to transmit the switching indicator or in a separate message.

The UE may initialize a first switching timer (block 973) and tunes one of its fully configurable receivers to the alternate RAT (block 975). According to an embodiment, the first switching timer may be used to control the duration of time that the UE's fully configurable receiver spends tuned to the alternate RAT. The UE's fully configurable receiver remains tuned to the alternate RAT until the first switching timer expires (block 977). Once the first switching timer expires, the UE may retune the fully configurable receiver back to the current RAT (block 979) and UE operations 950 may then terminate.

FIG. 9c illustrates a flow diagram of eNB operations 980 in switching mode operation, wherein the switching mode is initiated by an eNB. eNB operations 980 may be indicative of operations occurring at an eNB of a first wireless communications network as the network component participates in a UE controlled inter-RAT handover to a second wireless communications network.

eNB operations 980 may begin with the eNB receiving channel quality indicators from UEs that it is serving (block 985). Based on the received channel quality indicators, the eNB may be able to determine if it wishes that some of its UEs should be operating in switching mode (block 987). For example, the eNB may determine that its UEs with channel quality indicators below a specified threshold operate in switching mode.

The eNB may transmit a message to the UEs that it has determined should be operating in switching mode (block 989). The message may contain a switching indicator that instructs the UEs receiving the message to operate in switching mode. The message may also contain additional information that may be needed for switching mode operation, such as the duration of the first specified amount of time, i.e., the amount of time that one of the UE's fully configurable receivers spends tuned to the alternate RAT, the duration of the second specified amount of time, i.e., the amount of time that the fully configurable receiver that is used to tune to the alternate RAT spends tuned to the current RAT, and so forth. However, if the eNB is to control the operation of the UE while it is in the switching mode by transmitting messages to initiate the fully configurable receiver switching, then the message may only contain the switching indicator. eNB operations 980 may then terminate.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communications device operations, the method comprising:

sending a request to a controller of the communications device to change an operating mode of the communications device, wherein the request comprises a request to switch from a first multiple input, multiple output (MIMO) operating mode to a second MIMO operating mode, wherein the first MIMO operating mode is of higher rank than the second MIMO operating mode;

receiving a transmission responsive to the request; and in response to determining that the controller has granted the request to change the operating mode and that the communications device is operating in a border cell, changing the operating mode of the communications device, tuning at least one receiver of the communications device to an alternate radio access technology (RAT), wherein the communications device comprises N receivers, where N is greater than or equal to two, and wherein tuning the at least one receiver comprises tuning M receivers to a second RAT, wherein M is less than N, and initiating a handover with the alternate RAT.

2. The method of claim 1, further comprising:
measuring a channel quality of a communications channel between the controller and the communications device; and
transmitting the measured channel quality to the controller.

3. The method of claim 2, wherein the sending, the receiving, and the in response to determining, occur in response to determining that the measured channel quality meets a condition.

4. The method of claim 3, wherein the condition comprises the measured channel quality is below a threshold.

5. The method of claim 1, wherein the transmission includes an indication to tune the at least one receiver of the communications device to the alternate RAT.

6. The method of claim 1, further comprising, prior to tuning at least one receiver of the communications device, determining that network conditions indicate the tuning of at least one receiver to the alternate RAT.

7. A method for communications device operations, the communications device having multiple fully configurable receivers, the method comprising:
starting a first timer;
changing a multiple input, multiple output (MIMO) mode of the communications device from a first MIMO mode to a second MIMO mode, wherein the first MIMO operating mode is of higher rank than the second MIMO operating mode;
after the changing, tuning at least one fully configurable receiver to an alternate radio access technology (RAT); and
in response to determining that the first timer has expired, tuning the at least one fully configurable receiver back to a current RAT, after tuning the at least one fully configurable receiver back to the current RAT, changing a MIMO mode of the communications device from the second MIMO mode to a third MIMO mode, wherein the third MIMO operating mode is of higher rank than the second MIMO operating mode.

8. The method of claim 7, further comprising:
starting a second timer; and
in response to determining that the second timer has expired, tuning the at least one fully configurable receiver back to the alternate RAT.

9. The method of claim 7, further comprising, receiving a first initial value for the first timer and a second initial value for the second timer.

10. The method of claim 7, wherein the communications device comprises N receivers, where N is greater than or equal to two, and wherein tuning at least one fully configurable receiver to the alternate RAT comprises tuning M receivers to the alternate RAT, wherein M is less than N.

11. The method of claim 10, wherein tuning the at least one fully configurable receiver back to the current RAT comprises tuning M receivers back to the current RAT.

12. A communications device comprising:
a processor configured to execute applications and programs;
a memory coupled to the processor, the memory configured to store applications and programs;
a radio frequency (RF) circuit having multiple fully configurable receivers, each fully configurable receiver configured to receive information, the RF circuit coupled to the processor, the RF circuit configured to independently tune a first subset of the fully configurable receivers to a first radio access technology (RAT) and a second subset of the fully configurable receivers to a second RAT;
a global control function configured to generate a control signal for each of the fully configurable receivers, wherein each control signal selects a RAT for a fully configurable receiver, wherein the processor and global control function are further configured to switch a multiple input, multiple output (MIMO) mode of the communications device from a first MIMO mode to a second MIMO mode, wherein the first MIMO operating mode is of higher rank than the second MIMO operating mode; and
a plurality of switches, each switch coupled to the global control function, and between a fully configurable receiver and an antenna, each switch configured to couple the antenna to RF circuitry specific to a RAT to the fully configurable receiver based on a control signal provided by the global control function.

13. The communications device of claim 12, further comprising:
a transmitter configured to transmit information; and
a duplexer coupled to the transmitter, one fully configurable receiver, and the antenna, the duplexer configured to allow the transmitter and the one fully configurable receiver to share the antenna.

14. The communications device of claim 12, wherein the control signals produced by the global control function also are used to select baseband processing for information received by the fully configurable receivers.

15. The communications device of claim 12, wherein the global control function comprises, a plurality of control functions, with one control function for each fully configurable receiver.

16. The communications device of claim 12, wherein the control signals generated by the global control function is based on an operating mode of the communications device.

17. The communications device of claim 12, the global control function is implemented in baseband.

18. A method for communications device operations, the method comprising:
sending a request to a controller of the communications device to change an operating mode of the communications device, wherein the request comprises a request to switch from a first multiple input, multiple output (MIMO) operating mode to a second MIMO operating mode, wherein the first MIMO operating mode is of higher rank than the second MIMO operating mode;
receiving a transmission responsive to the request; and
in response to determining that the controller has granted the request to change the operating mode and that the communications device is operating in a border cell,
changing the operating mode of the communications device,
tuning at least one receiver of the communications device to an alternate radio access technology (RAT), and
initiating a handover with the alternate RAT.

19. The method of claim 18, further comprising:

measuring a channel quality of a communications channel between the controller and the communications device; and transmitting the measured channel quality to the controller.

20. The method of claim 19, wherein the sending, the receiving, and the in response to determining, occurs in response to determining that the measured channel quality meets a condition.

21. The method of claim 20, wherein the condition comprises the measured channel quality is below a threshold.

22. The method of claim 18, wherein the transmission includes an indication to tune the at least one receiver of the communications device to the alternate RAT.

23. The method of claim 18, further comprising, prior to tuning at least one receiver of the communications device, determining that network conditions indicate the tuning of at least one receiver to the alternate RAT.

* * * * *